United States Patent

Grover et al.

Patent Number: 5,818,437
Date of Patent: Oct. 6, 1998

[54] REDUCED KEYBOARD DISAMBIGUATING COMPUTER

[75] Inventors: Dale L. Grover, Lansing, Mich.; Martin T. King, Vashon, Wash.; Clifford A. Kushler, Wooster, Ohio

[73] Assignee: Tegic Communications, Inc., Seattle, Wash.

[21] Appl. No.: 507,756

[22] Filed: Jul. 26, 1995

[51] Int. Cl.$^6$ .................................................. G06F 15/00
[52] U.S. Cl. ........................ 345/326; 345/352; 345/353; 364/728; 364/728.1
[58] Field of Search ............................. 395/326; 364/928, 364/928.1, 928.2, 928.3, 928.4, 928.5, 928.6; 345/326, 352, 353

[56] References Cited

U.S. PATENT DOCUMENTS

| | | | |
|---|---|---|---|
| 3,647,973 | 3/1972 | James et al. | 379/97 |
| 3,967,273 | 6/1976 | Knowlton | 341/22 |
| 4,191,854 | 3/1980 | Coles | 379/96 |
| 4,360,892 | 11/1982 | Endfield | 395/796 |
| 4,381,502 | 4/1983 | Prame | 341/26 |
| 4,426,555 | 1/1984 | Underkoffler | 379/97 |
| 4,427,848 | 1/1984 | Tsakanikas | 379/88 |
| 4,442,506 | 4/1984 | Endfield | 341/22 |

(List continued on next page.)

FOREIGN PATENT DOCUMENTS

| | | |
|---|---|---|
| 0 319 193 A3 | 6/1989 | European Pat. Off. . |
| 0 464 726 A2 | 1/1992 | European Pat. Off. . |
| 0 540 147 A2 | 5/1993 | European Pat. Off. . |
| 0 651 316 A1 | 5/1995 | European Pat. Off. . |
| 0 689 122 A1 | 12/1995 | European Pat. Off. . |
| WO89/05745 | 6/1989 | WIPO . |
| WO90/07149 | 6/1990 | WIPO . |
| WO 97/05541 | 2/1997 | WIPO . |

OTHER PUBLICATIONS

Levine, S.H. et al., "Adaptive Technique for Customized Interface Design With Application to Nonvocal Communication," *RESNA 9th Annual Conference*, Minneapolis, Minnesota, 1986.

Levine, S.H., "An Adaptive Approach to Optimal Keyboard Design for Nonvocal Communication," *IEEE*, 1985.

Swiffin, A.L. et al., "Adaptive and Predictive Techniques in a Communication Prosthesis," *AAC Augmentative and Alternative Communication* (1987).

(List continued on next page.)

*Primary Examiner*—Matthew M. Kim
*Assistant Examiner*—Ba Huynh
*Attorney, Agent, or Firm*—Christensen O'Connor Johnson & Kindness PLLC

[57] ABSTRACT

A reduced keyboard disambiguating computer. The keyboard has twelve keys, nine of them labeled with numerous letters and other symbols, and those nine plus one more are labeled each with one of the ten digits. Textual entry keystrokes are ambiguous. The user strikes a delimiting "select" key at the end of each word, delimiting a keystroke sequence which could match any of many words with the same number of letters. The keystroke sequence is processed with a complete dictionary, and words which match the sequence of keystrokes are presented to the user in order of decreasing frequency of use. The user selects the desired word. The letters are assigned to the keys in a non-sequential order which reduces chances of ambiguities. The same "select" key is pressed to select the desired word, and spacing between words and punctuation is automatically computed. For words which are not in the dictionary, two keystrokes are entered to specify each letter. The system simultaneously interprets all keystroke sequences as both one stroke per letter and as two strokes per letter. The user selects the desired interpretation. The system also presents to the user the number which is represented by the sequence of keystrokes for possible selection by the user.

32 Claims, 24 Drawing Sheets

U.S. PATENT DOCUMENTS

| | | | |
|---|---|---|---|
| 4,481,508 | 11/1984 | Kamei et al. | 345/171 |
| 4,549,279 | 10/1985 | Lapeyre | 364/709.15 |
| 4,649,563 | 3/1987 | Riskin | 379/97 |
| 4,661,916 | 4/1987 | Baker et al. | 395/2.69 |
| 4,674,112 | 6/1987 | Kondraske et al. | 379/96 |
| 4,677,659 | 6/1987 | Dargan | 379/97 |
| 4,754,474 | 6/1988 | Feinson | 379/96 |
| 4,791,408 | 12/1988 | Heusinkveld | 364/189 |
| 4,817,129 | 3/1989 | Riskin | 379/88 |
| 4,823,294 | 4/1989 | Rouhani | 364/709.12 |
| 4,846,598 | 7/1989 | Livits | 400/472 |
| 4,849,732 | 7/1989 | Dolene | 341/20 |
| 4,866,759 | 9/1989 | Riskin | 379/97 |
| 4,872,196 | 10/1989 | Royer et al. | 379/58 |
| 4,891,777 | 1/1990 | Lapeyre | 364/206 |
| 5,031,206 | 7/1991 | Riskin | 379/97 |
| 5,035,205 | 7/1991 | Schiller et al. | 119/168 |
| 5,063,376 | 11/1991 | Chang | 345/163 |
| 5,065,661 | 11/1991 | Hacker | 84/719 |
| 5,067,103 | 11/1991 | Lapeyre | 364/709.16 |
| 5,087,910 | 2/1992 | Guyot-Sionnest | 345/169 |
| 5,131,045 | 7/1992 | Roth | 704/237 |
| 5,156,475 | 10/1992 | Zilberman | 400/472 |
| 5,163,084 | 11/1992 | Kim et al. | 379/88 |
| 5,200,988 | 4/1993 | Riskin | 379/52 |
| 5,214,689 | 5/1993 | O'Sullivan | 379/88 |
| 5,218,538 | 6/1993 | Zhang | 395/796 |
| 5,229,936 | 7/1993 | Decker et al. | 395/760 |
| 5,255,310 | 10/1993 | Kim et al. | 379/88 |
| 5,258,748 | 11/1993 | Jones | 345/172 |
| 5,281,966 | 1/1994 | Walsh | 341/22 |
| 5,289,394 | 2/1994 | Lapeyre | 364/709.12 |
| 5,305,205 | 4/1994 | Weber et al. | 707/531 |
| 5,317,647 | 5/1994 | Pagallo | 382/161 |
| 5,339,358 | 8/1994 | Danish et al. | 379/368 |
| 5,388,061 | 2/1995 | Hankes | 364/708.1 |
| 5,392,338 | 2/1995 | Danish et al. | 379/93.27 |

OTHER PUBLICATIONS

Swiffin, A.L. et al., "PAL: An Effort Efficient Portable Communication Aid and Keyboard Emulator," *RESNA 8th Annual Conference*, Memphis, Tennessee, 1985.

Smith, Sidney L. et al., "Alphabetic Data Entry Via th Touch–Tone Pad: A Comment," *Human Factors*, 13(2), pp. 189–190, 1971.

Witten, I.H., "Principles of Computer Speech," New York: Academic Press, (1982), pp. 246–253.

Minneman, S.L., "A Simplified Touch–Tone® Telecommunication Aid for Deaf and Hearing Impaired Individuals," *RESNA 8th Annual Conference*, Memphis Tennessee, 1985.

Levine, S.H. et al., "Computer Disambiguation of Multi–Character Key Text Entry: An Adaptive Design Approach," *IEEE*, 1986.

Foulds, R. et al., "Lexical Prediction Techniques Applied to Reduce Motor Requirements for Augmentative Communication," *RESNA 10th Annual Conference*, San Jose, California, 1987.

Foulds, R.A. et al., "Statistical Disambiguation of Multi–Character Keys Applied to Reduce Motor Requirements for Augmentative and Alternative Communication," *AAC Augmentative and Alternative Communication* (1987).

Levine, S.H. et al., "Multi–Character Key Text Entry Using Computer Disambiguation," *RESNA 10th Annual Conference*, San Jose, California, 1987.

Kreifeldt, J.G. et al., "Reduced Keyboard Designs Using Disambiguation," *Proceedings of the Human Factors Society 33rd Annual Meeting*—1989.

Arnott, J.L. et al., "Probabilistic Character Disambiguation for Reduced Keyboards Using Small Text Samples," *AAC Augmentative and Alternative Communication*, vol. 8 (Sep. 1992).

King, M.T., "Just Type™–Efficient Communication with Eight Keys," *Proceedings of the RESNA '95 Annual Conference*, Vancouver, BC, Canada, 1995.

Oommen, B.J. et al., "Correction to 'An Adaptive Learning Solution to the Keyboard Optimization Problem,'" *IEEE Transactions on Systems, Man, and Cybernetics*, 22:5 (Oct., 1992).

Matias, E. et al., "Half–QWERTY: Typing With One Hand Using Your Two–Handed Skills," *Conference Companion, CHI '94*, (Apr. 24–28, 1994).

Kamphuis, H. et al., "Katdas; A Small Number of Keys Direct Access System," *RESNA 12th Annual Conference*, New Orleans, Louisiana, 1989.

"Speed Keyboard for Data Processor," IBM Technical Disclosure Bulletin, vol. 23, pp. 838–839, Jul. 1980. © IBM Corp., 1993.

Sugimoto, M. et al., "SHK: Single Hand Key Card for Mobile Devices," *CHI 1996* (Apr. 13–18, 1996).

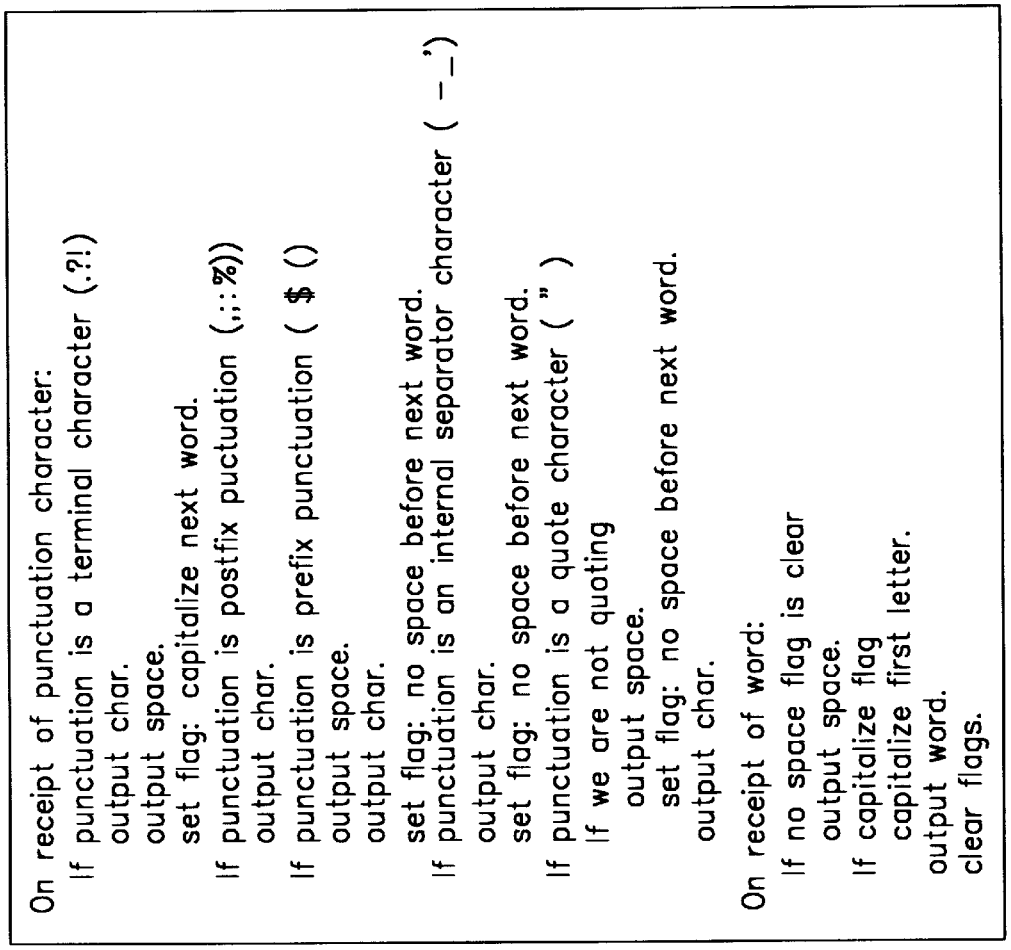
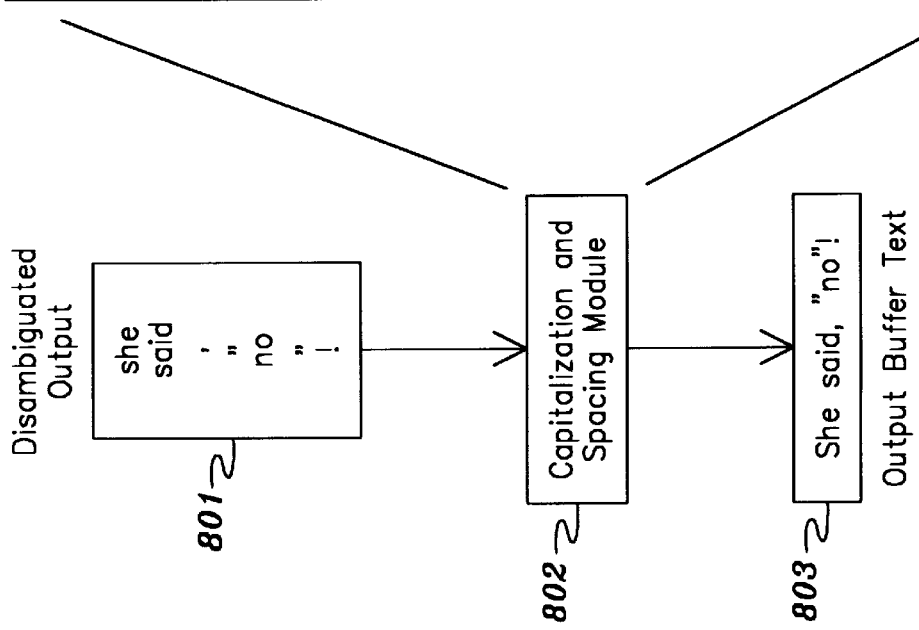
FIG. 8

Output Buffer Item Data Structure

| Item | Type |
|---|---|
| Key sequence | Array of integers |
| List tag | Integer handle |
| Text object | Pointer to string |
| Graphic object | Pointer to bitmap |
| Display attributes | Pointer to structure |

REDUCED KEYBOARD DISAMBIGUATING COMPUTER

BACKGROUND

For many years, portable computers which may be used for writing have been getting smaller and smaller. The principal size-limiting component is the keyboard. Pocket-sized computers have been produced with miniature keyboards, but the keys are too small for fast entry with the fingers. If regular size keys are used, the size of the portable computer is limited by the width of the keyboard. IBM has addressed this problem by designing a full-sized keyboard that breaks into two pieces which overlap each other when the computer cover is closed.

Another problem with portable computers for writing is the difficulty of holding the computer with one hand while entering keys with the other. For fast keyboard entry, the computer must be supported on a work surface so that the user can type with both hands.

What is needed is a computer that can be supported with one hand while the other hand enters keystrokes on a keyboard which is no wider than the human hand and which has keys the size of human fingers. The keyboard therefore must have a reduced set of keys which is no more than five keys wide. Prior development work on such a reduced keyboard has focused on requiring two or more keystrokes for specification of a letter, either simultaneously (chording) or in sequence (two-stroke specification). Neither approach has produced a keyboard which allows adequate simplicity and efficiency of use. Two-stroke specification is too inefficient, and chording is too complicated to learn and use.

SUMMARY OF THE INVENTION

By our research and experimentation, we have found a method of producing a highly efficient reduced keyboard which is used in conjunction with a display. The display serves both the keyboard function and the usual functions of a computer, allowing a computer of very small size. The invented computer allows high speed entry of textual writing on full-sized keys.

The user is presented with a keyboard with full-sized keys with a total required width no greater than three keys. Preferably, the keyboard has twelve keys: three columns by four rows. Alternative embodiments have as few as three or as many as twenty keys. A plurality of letters and symbols are assigned to most of the keys. Textual entry keystrokes are therefore ambiguous. The user strikes a delimiting key at the end of each word, delimiting a keystroke sequence which could match any of many words with the same number of letters. The keystroke sequence is processed with a complete dictionary containing the spelling of all of the words that a user might reasonably be expected to enter. Words which match the sequence of keystrokes are presented to the user on a display. The words are presented in order of decreasing frequency of use, and the user moves a cursor or highlight bar to the desired word to add that word to the textual composition.

An important aspect of the invention which allows high efficiency is that the letters are assigned to the keys in a non-sequential order. That is, instead of assigning the letters from a to z in sequential order, the letters are grouped onto keys in a way which reduces the frequency of ambiguities for the words of the English language. Foreign language versions use the same principle but have different groups of letters on each key to achieve minimum ambiguity in that language.

Because ambiguities are reduced and the words are presented in frequency of use order, the desired word is most often the first word presented and is frequently the only word presented. In the preferred embodiment, the key which the user presses to advance from the most frequently used word to the second most frequently used word, and then presses again to advance to the third most frequently used word, is the same key that is used to delimit the end of a word. Furthermore, the highlighted word is automatically selected and added to the composition by the pressing of any letter key. No other key press is required between words, as the appropriate space is computed automatically.

The combined effects of non-sequential assignment of letters to keys, making the delimit key the same as the select key, causing a selected word to be added to the composition by the pressing of a letter key, and automatically computing spaces produces a surprising result: for 99% of text entry, the same number of keystrokes is required to enter text with invented computer system as for entry of text with a conventional keyboard. Typically, once a word is entered, the select key is pressed (rather than a space bar) and, as the first presented word is the desired word most of the time, the user simply proceeds to enter the next word with no more than the usual number of keystrokes, the select key having replaced the spacebar key.

Upon striking the select key, the most frequently used word is presented both in a list of alternative words that might be intended and in the appropriate place within the text that the user is writing. The user keeps his or her eyes on the completed text. If it is correct, the user proceeds to enter the next word. If it is not, the user looks to the list of possible words and presses the select key an additional number of times to select the desired word before then proceeding to enter the next word.

Of course, the computer system requires a method for entry of words which are not in the dictionary, such as unusual names and made up words. For this purpose, the invention uses a two-stroke specification method which is well known. However, the invention does not require the user to change modes to enter letters by the two-stroke specification. Instead, the system simultaneously interprets each sequence of keystrokes as both an ambiguous sequence of one stroke per letter and as a fully specified sequence of two strokes per letter. Both of the alternatives are displayed in the list of possible words. Therefore, when the user wishes to enter a word which is not in the dictionary, the user simply enters two keystrokes per letter and then presses the select key to select the two-stroke interpretation of the sequence of keystrokes. Having once specified the spelling of a word which was not in the dictionary, the user never again needs to enter it. The system automatically adds the word to the computer's dictionary so that it can subsequently be displayed upon entry of one stroke per letter. To assist with two-stroke input, a visual indicator on the screen indicates which keystroke of the two-stroke method should come next.

The method for entering numbers is similar. In one embodiment, ten keys including all of the keys that contain letters are each assigned one of the digits 0–9. Each sequence of keystrokes may therefore be interpreted as the entry of a number. This interpretation is one of the plurality of interpretations presented to the user so that it can be selected by the user by pressing the select key. If the user is entering a series of numbers, the user can select a command which changes the priority of presentation so that the number is presented first and the select key need only be pressed once for each number entered.

In the preferred embodiment, the computer includes a standard dictionary so that the sequence of possible words presented to the user is always the same, and the user can commit to rote memory the keystrokes of those words which require two or more strokes of the select key. Additional vocabulary modules can be enabled within the computer. The additional vocabulary words can be caused to appear first or last in the list of possible words, with special coloration or highlighting, and the computer can be set such that selection of such a word causes an audible warning beep. Alternatively, the computer can be set to keep track of frequency of usage of words by the user and present first those words most frequently used by the user in his or her distinctive writing style.

The dictionary includes entries which automatically compensate for common spelling errors or keystroke errors. For example, words which include the letter sequence "ie" or "ei" will appear in the list of words even if these letters are reversed from their proper sequence.

The reduced keyboard disambiguating computer is also well suited for use by people with hand control disabilities. The keyboard may be configured to use seven keys for entry of letters and one key for "select", for a total of eight. Such eight keys may be organized in a circle with each key corresponding to one of eight directions indicated by movement of a joystick, head-pointing, or by movement of the eye as detected by an eye-tracking device.

BRIEF DESCRIPTION OF THE DRAWINGS

FIGS. 7a through 7l show the steps of the disambiguation method.

FIG. 8 shows the algorithm for automatically handling capitalization and spacing.

FIG. 11 shows the temporary data structure associated with each selected word.

DETAILED DESCRIPTION OF THE DRAWINGS

Overview

Figure 1:
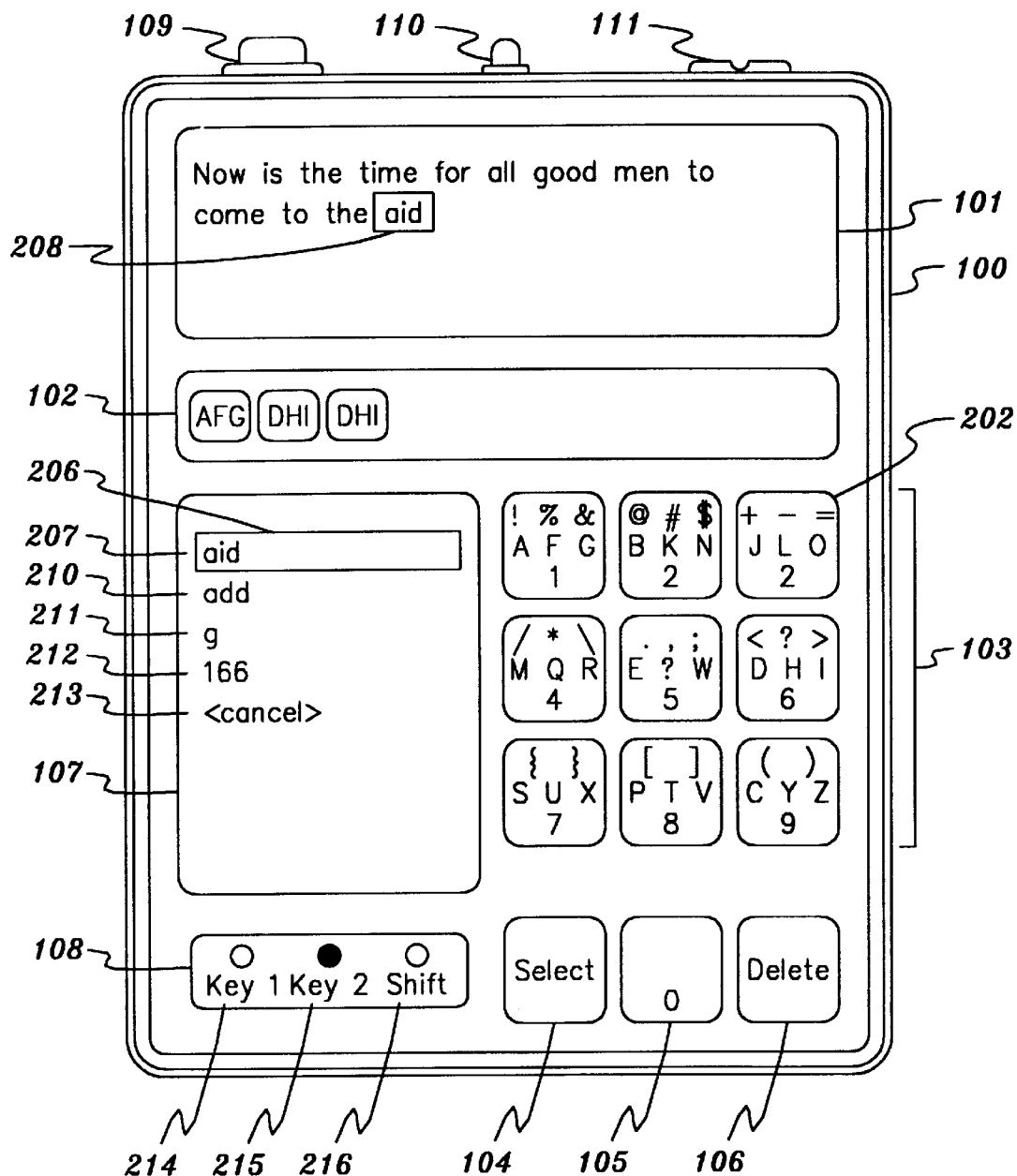
FIG. 1 shows the reduced keyboard disambiguating computer.

The portable reduced keyboard disambiguating computer is shown in FIG. 1. The top surface of the computer 100 is a touch-sensitive, color liquid crystal display (LCD) which both displays information to the user and accepts information from the user via key presses in the form of touches to the surface within regions that are programmed to be active. The text windows 101 serves as a buffer for text output and allows editing. The keystroke window 102 provides visual feedback and also allows editing of individual keystrokes. A keypad region includes nine data keys 103 and three system-level keys, labeled "select" 104, "0" 105, and "Delete" 106. In general, the functions of any of the keys can be programmed or re-programmed by the user or by the system itself. When reprogrammed, the labels on the key tops are changed.

The selection list menu window 107 lists choices available to the user. Its contents are sequentially accessed via repeated presses on the select key 104. The status window 108 provides information about the current state of the system. An external connector 109, and infrared transmitter/receiver 110, each provide for bidirectional serial communications with other devices (for example, with a personal computer). A speaker 111 provides auditory information to the user.

Figure 2:
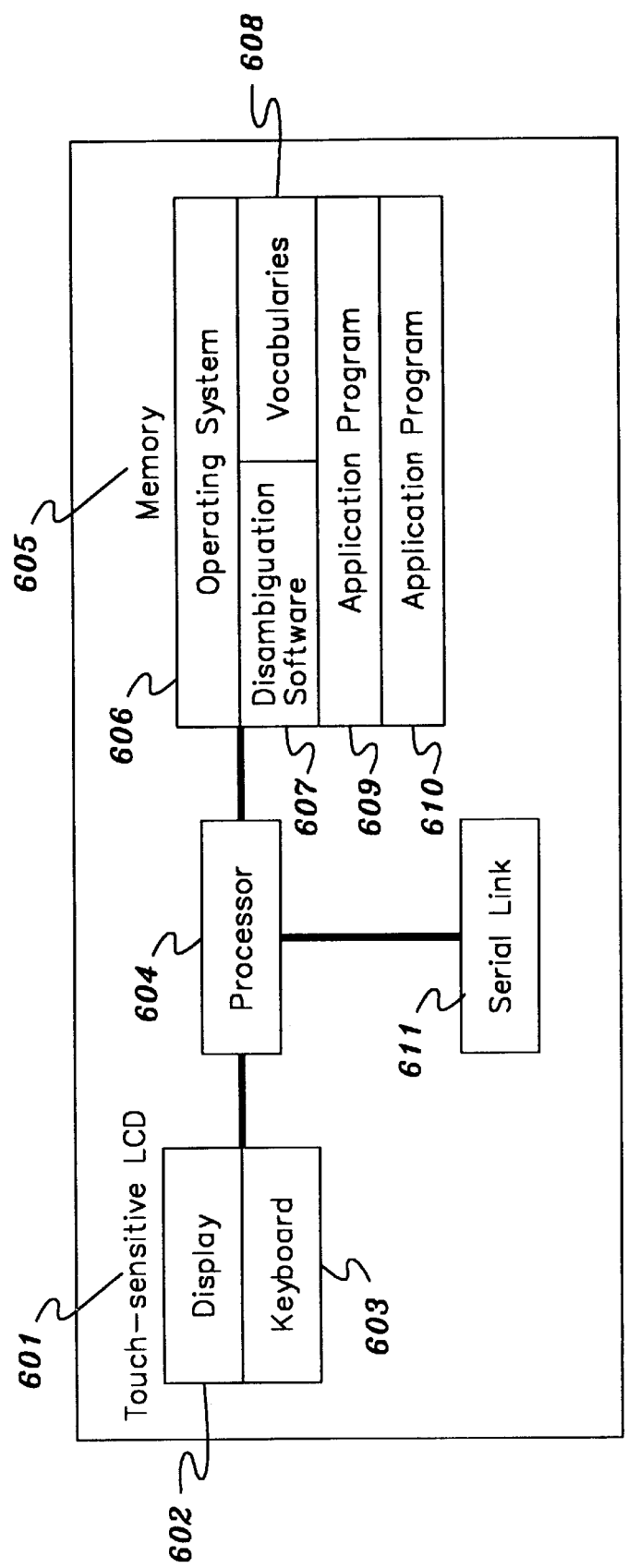
FIG. 2 shows the major components of the system.

FIG. 2 shows the major components of the system. The touch-sensitive LCD 601 serves as both display 602 and keyboard 603. The processor 604 executes instructions and reads and writes data from memory 605. Software instructions in memory include the operating system 606, the disambiguation program 607 and its vocabularies 608 (discussed below), and optionally one or more application programs 609, 610. For a dedicated purpose version of the system, such as a dictionary or a mere writing recorder, the processor and software instructions could be replaced by hard-wired logic circuits.

Example of target applications include word processors, software dictionaries, and foreign language translators. When the target application is speech synthesis software, this portable disambiguating computer functions as a communication aid.

The serial link 611 allows the system to communicate with external devices.

Basic Operation, Key Interpretations

Data is entered on the keypad 103 which is comprised of individual keys 202. Most of these keys have multiple meanings, represented by single or multiple symbols or graphics. Keystrokes are displayed in the keystroke window 102. Individual keys and multiple key sequences are interpreted in several ways simultaneously. The selection list menu 107 lists the various interpretations and options. The selection key 104 steps through items in the selection list menu, allowing the user to select one of the items. The selected item is highlighted 206. A copy of the data associated with a selected item 207 is posted provisionally as a highlighted item 208 in the output buffer 101.

One way the system interprets keystrokes is as spelled words of a language. Keys 202 contain symbols which include the letters of the alphabet. Since individual keys contain multiple letters, key sequences are sometimes ambiguous, spelling two or more possible words. As keys are entered, a dictionary look-up is performed to locate matching words. Candidate words 207 210 are presented for selection in the list menu, sorted according to a rank or priority associated with each word which reflects frequency of use. Surprising efficiencies can be achieved by ordering the letters as shown in FIG. 1. With theses keypad letter assignments, the desired word appears at the top of the selection list menu 107 about 99% of the time. For simple text, this translates to a keystroke efficiency of about one additional keystroke per hundred words typed.

Another way the system simultaneously interprets keystrokes is as digits. Individual keys 202 also contain symbols representing digits. Key sequences thus also appear as a string of digits 212 in the selection list menu.

Another way the system simultaneously interprets keystrokes is as unambiguous symbols formed by pairs of keys. The upper portion of the keypad 103 is comprised of 9 keys in a 3-by-3 array. Individual keys 202 likewise contain up to 9 symbols, also arranged in a 3-by-3 array on the face of each key. In the figures, symbols for some of the nine positions on each key are not shown; they may be defined by the user or added by an application program 609, 610. The first keystroke in each two-stroke pair is ambiguous; it tells the system that the user may wish to choose one of the 9 symbols grouped on this key, but does not specify which symbol. The second keystroke qualifies or disambiguates the first; by its position in the 3-by-3 array of keys it specifies which symbol is to be chosen from the 3-by-3 array of symbols on the first key. The resulting sequence of symbols 211 generated by pairs of keystrokes appears in the selection list menu along with the other interpretations of the key sequence. Indicator fields in the status window 108 show whether the next keystroke will be the first 214 or second 215 of a pair.

Finally, any sequence of keystrokes may be given additional meanings by the user, by a vocabulary (discussed below), or by another component of the system. Multiple interpretations appear as multiple entries in the selection list menu or on the faces of individual keys. Disambiguation occurs when the user selects one of these multiple entries, either by directly pressing an associated key, or by using the select key to step to the item in the selection list menu.

In some cases, disambiguating one group of items leads to another ambiguous group of items. For example, an item associated with a particular key or appearing in the selection list menu may, when selected or executed, take the system to a new state which provides the user with additional choices and selections. This is similar in operation to nested menus commonly employed by personal computers. Here, however, there are two complementary menu structures. One menu is comprised of the selection list menu 107. A second menu is represented by the keypad keys 103. The system switches back and forth between these two menu structures, with an item selected from one menu bringing up a new group of items in the other menu. This process is described further below in conjunction with FIGS. 7a–7l.

Figure 3:
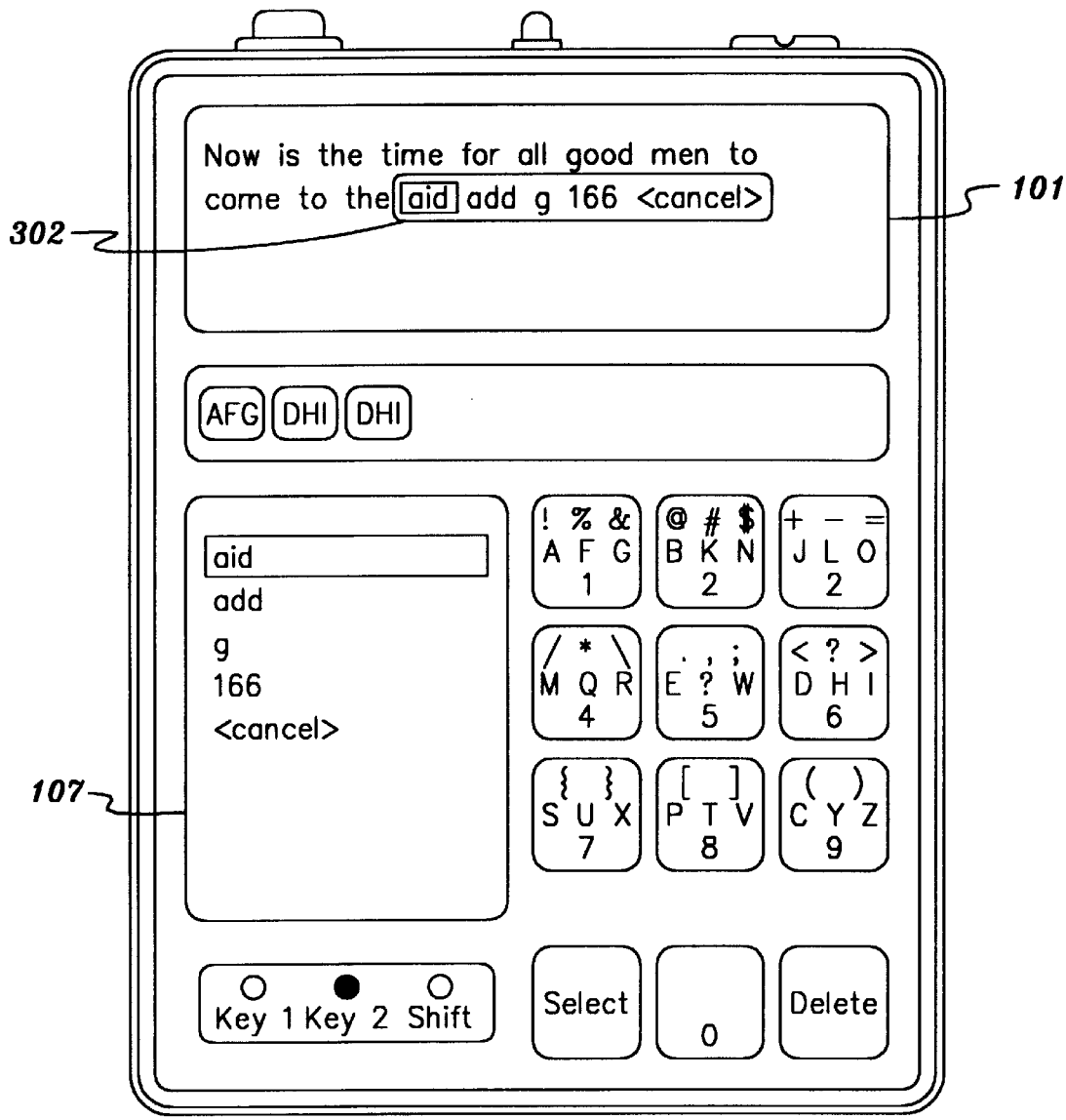
FIG. 3 shows the selection list menu appearing in the output text buffer.

The selection list menu 107 may be made to appear directly in the output buffer, either as a pop-up window or as a delimited string of options in the output text itself. In FIG. 3 the user has enabled the feature which places an abbreviated form of the selection list menu 302 directly in the output text buffer 101. Individual items in the selection list appear sequentially. The currently selected item is highlighted. Once a selection is complete this in-line menu is removed, leaving only the desired item in the output. An important aspect of this "in-place disambiguation" feature is that the selection list is presented at the user's point of gaze in the output document.

Data keys and Selection List Menus

Like keypad keys, items in the selection list menu 107 can also have multiple meanings or interpretations. This ambiguity is resolved by assigning individual keys to each choice or interpretation, so that selecting an item in the list menu brings up a new group of key choices. See FIGS. 7b and 7c. In the present device the key faces are redrawn during the selection process to reflect their new meanings as shown in FIG. 7d. This process is sometimes iterated: in FIG. 7a, a key with ambiguous meanings 713 leads to a list menu of multiple items for selection 706–710, and, in FIG. 7c, selection of a list item 708 leads to new meanings for some or all of the keypad keys 719.

Items in the selection list menu may be selected and activated in three ways. First, items may be highlighted and selected by sequentially stepping to them with repeated presses of the select key. Items selected in this fashion are acted on after a delay period whose duration is user-programmable. Before this delay has expired, the user may type any key other than select to execute the selected item immediately. This keystroke is also interpreted as the first key of a new sequence of keys.

Figure 4:
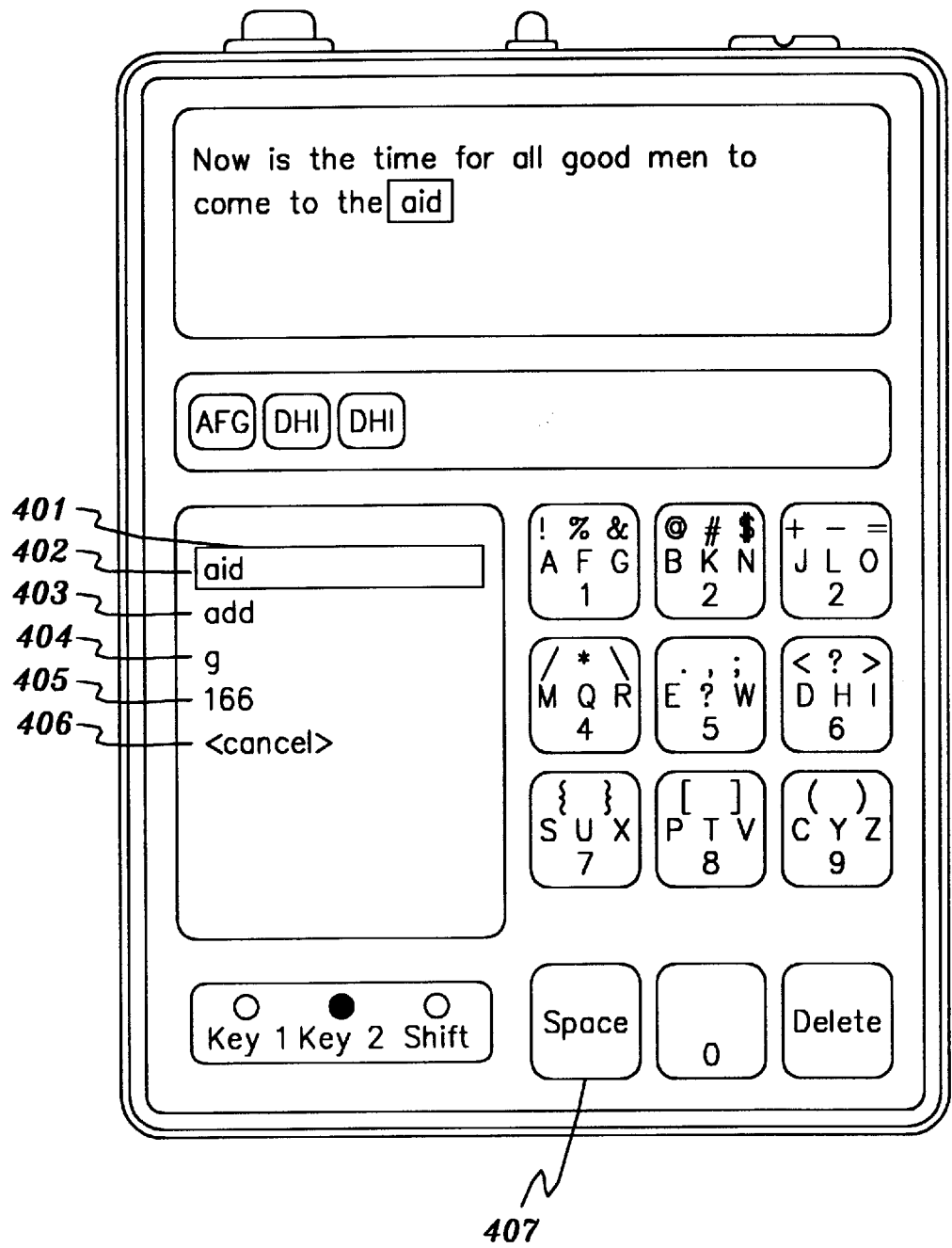
FIG. 4 shows the select key replaced by a space key.

The second selection technique is enabled via a system menu. As shown in FIG. 4, the select key may be replaced by a space key 407. Pressing the space key executes the currently selected item in the selection list box and appends a space to the output buffer (additional space key presses simply append additional spaces). By default, the first item in the selection list menu 402 is always selected. Selecting a different item is accomplished by touching the selection highlight bar 401 and dragging it to the location of another item in the list 403–406.

Figure 5:
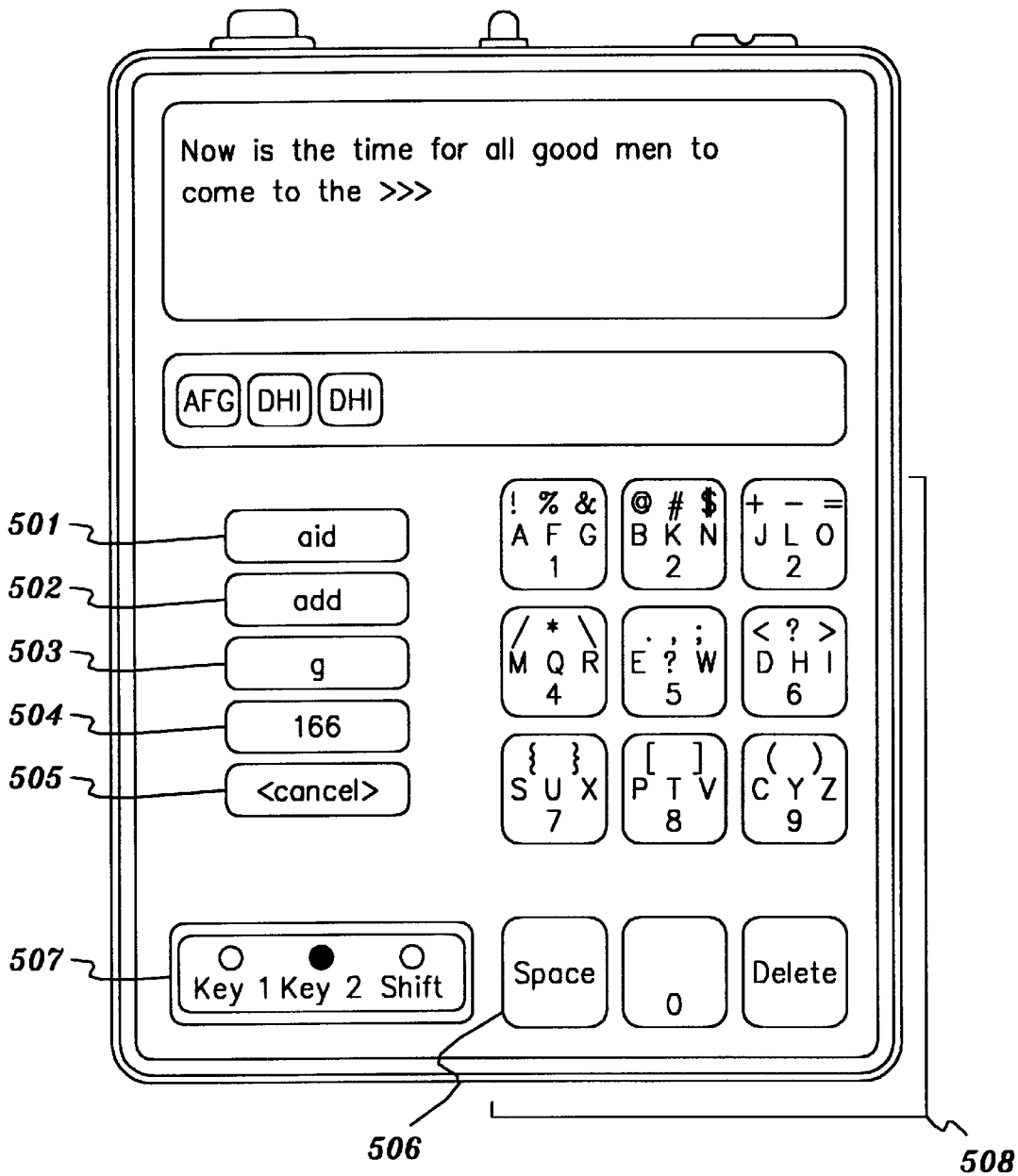
FIG. 5 shows the selection list presented as a key menu.

In the third selection technique, shown in FIG. 5, the selection list menu items appear as a group of keys 501–505. A displayed item may be selected and activated at any time simply by pressing its associated key. Since sequential access to the selection list is no longer required, the key formerly used for select is now available as a user-programmable key. By default, this key is assigned the function of a space key 506. In this technique it is useful, for ergonomic reasons, to associate a portion of the touch-sensitive screen 507 with the first selection list key 501, even though this portion of the screen is not displayed as a key. This allows the user to rapidly select the first item using the thumb without moving his or her hands from the keypad 508. For people who are left handed, a system command switches the positions of the keypad 508 and the list menu column 501–507.

Individual keys and items in the selection list menu represent actions which the system can execute. In the case of disambiguated or spelled text, the action is to output text from the system. Text items from the selection list may be passed to the output buffer 101 for storage and editing, or forwarded to another application program 609, 610. Other items in the selection list menu include the names of macros and system commands to be executed. Some selection list menu items are executed as soon as they are highlighted; most items only execute when the selection has been confirmed, i.e., after a timed delay or when any non-select key is entered as shown in FIGS. 7a–7l. In FIG. 1, "<cancel>" 213 is an example of a named executable object appearing in the selection list menu; when the user steps to the <cancel> item, the current key sequence is immediately cancelled.

It is useful to view this implementation of the disambiguation system as two menu structures which interact and combine their function. The nine data keys 103 generally represent groups of alphabetic characters and other symbols. But since the function and appearance of these keys may be dynamically changed, it is useful to think of the keypad as a "key menu" from which items may be directly selected by pressing a particular key.

The items in the selection list menu 207–213 can be accessed sequentially via the select key 104. Pressing this key repeatedly steps through each item in the list menu box. An alternative means of access is demonstrated by FIG. 5. Here, dedicated individual keys are associated with each selection list menu item. Since these keys are displayed with a dynamic display, their associated menu items appear directly on the key faces 501–505.

Figure 6:
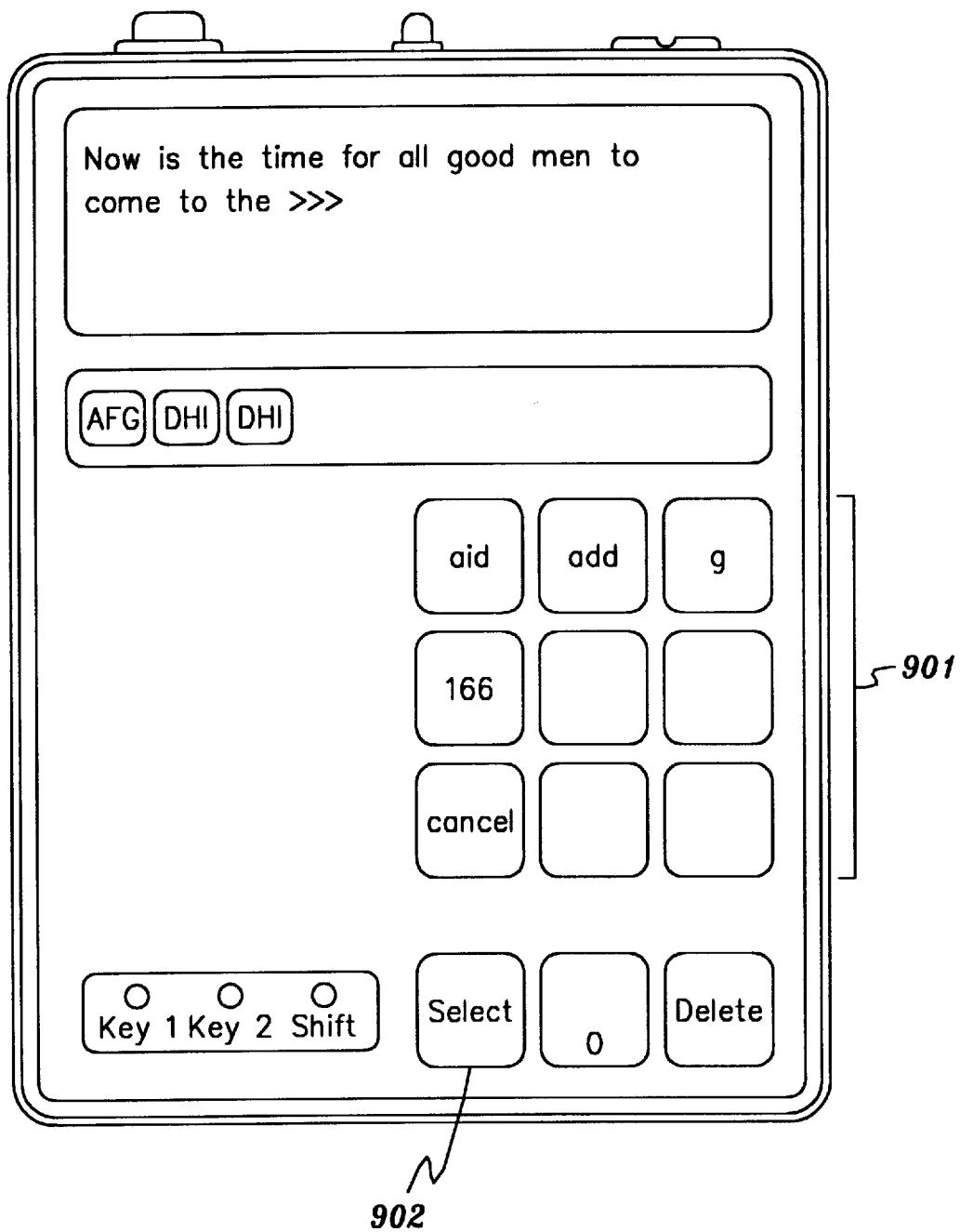
FIG. 6 shows a configuration where data input and direct menu selections are performed on the same keys.

FIG. 6 shows a combined configuration where data input and direct menu selection are performed by the same set of keys 901. In this configuration, the select key 902 is pressed a single time to indicate end of word and place the system in select state. At this point some of the data keys become direct select keys; pressing them directly selects one of the available selection items. Both this configuration of FIG. 6 and the selection list configuration 302 of FIG. 3 each allow the computer to be no wider than the three column keyboard.

Visible and Audition Feedback

Information about the state of the system is provided to the user by both auditory and visual feedback. Different types of items 207, 211, 212, 213 in the selection list menu 107 are presented in different colors. Key faces 202 are redrawn with dim attributes whenever the key is currently unavailable for word-level disambiguation, i.e., when no word in the vocabularies includes the key's symbols or letters at the current character position.

Audible tones indicate the state of the selection list menu and provide feedback about key presses. Distinct tones indicate when the selection list is empty, when it contains a single unique word, and when it contains multiple ambiguous words. Other tones distinguish the type of item being selected in the selection list menu: word, menu, key-pair text, digits string, etc. Finally, a unique tone is heard when the user presses a key which is dimmed or unavailable for a word (as described above).

Punctuating, Capitalizing, Spacing, Executing

The system described here has no dedicated "space" key and no dedicated "shift" key. Words are delimited whenever the user activates the select key. Capitalization and spacing are handled automatically by the software spacing module shown in FIG. 8. The module's input 801 is a text stream consisting of discrete words and punctuation symbols. A simple algorithm 802 sets state variables capitalize-next-word and no-space-before-next-word when punctuation is received, and applies these variables when subsequent words are received. The output 803 is a string of words and punctuation, with appropriate spacing and capitalization.

The system described here also has no dedicated "execute" key to execute an item once it has been selected with the select key. Instead, execution is implied and occurs automatically after a timed delay or when any non-select key is received. However, since it is sometimes useful to have these functions represented on dedicated keys, system keys 104–106 can be re-programmed to perform as "space," "shift," or "execute" keys.

Vocabularies

Items in the selection list menu are usually provided by several vocabulary modules. Vocabularies are libraries of objects which are associated with key sequences. Each vocabulary module includes code for handling the particular kind of object for which that vocabulary is responsible.

The vocabularies are polled with every new key sequence, giving each vocabulary an opportunity to respond. In addition to a standard word vocabulary, the user may choose to load additional vocabularies of words, phrases, blocks of text, and macros. Word vocabularies map common misspelling and typing errors to correct words. Other vocabularies contain executable code; these vocabularies are responsible for much of the system operation (e.g., system menus), and run pieces of their stored code upon receipt of appropriate key sequences.

To determine the sequences of words or other objects in the selection list 107, priorities are established between each vocabulary. The words or objects of a vocabulary are all presented together as a group ahead of the words of another vocabulary with a lower priority. Within each vocabulary, the words or objects which match a particular key sequence are also given a priority which determines their relative presentation with respect to each other. For the custom vocabulary which reflects frequency of use by the user, the priority for each word is a number which is incremented by one every time the word is selected. If two ambiguous words have the same priority number based on usage, the standard vocabulary is consulted and the relative priority numbers of that vocabulary are used. This tie breaker system is frequently accessed when the user first begins building his or her own vocabulary. If, for a single key sequence, the priority number for one of the associated words reaches the maximum size for the number field in the memory, all of the priority numbers for that key sequence are divided by two.

The relationship between vocabulary objects and key sequences is not rigid; how a vocabulary responds to a particular key sequence is an implementation detail of the vocabulary. The standard word vocabulary, for example, looks ahead to see how many longer words have initial letters matching the current key sequence. If only two words are possible, the standard word vocabulary places these longer words in the selection list menu before all the letters for the word are entered. This allows the user to optionally select these words immediately, without completing their spelling.

Objects from vocabularies include data fields which describe how the object is to be displayed and handled in the selection list menu or on a key face. This information includes priority or order of appearance in the selection list, the text or graphic to display, color and video attributes, and the addresses of routines to call if the object is highlighted or selected or if its associated key is pressed.

Word objects include data fields indicating part of speech, frequency of use, and information needed for constructing various inflections and endings. Vocabularies optionally use the part of speech information to implement syntactical analysis to further assist in the disambiguation process.

Many of the properties associated with system objects are user-programmable. For example, the user can specify the order and appearance of individual items or classes of items in the selection list menu. In the case of word or text entries, the default word order is by decreasing frequency of use in a representative corpus of usage. The user may optionally elect to order text items according to frequency of use in the user's own text output.

Keying techniques

This system supports four techniques for access to system commands and menus. First, the system keys 104–106 can be programmed to directly perform a system function (for example, delete the last word entered) or to present a system menu (for example, present a menu of additional delete options).

Second, system functions and menus are activated when keys are pressed and held for specific durations. When this feature is enabled, the activation timing which determines how long a key must be held is controlled by user-programmable parameters.

Third, system menus appear in the selection list menu on the first non-select keystroke after the select key has been pressed. This first keystroke of a new key sequence generally corresponds to the first letter of a new word. When the system is used with the English language, only the keys containing the letters "A" and "I" lead to one-letter words; for the remaining keys there are no standard words to select after the first keystroke, so system menus placed at these locations are easily accessed.

Fourth, system functions are accessible via two kinds of input chording. Asynchronous chording allows special functions to be programmed to occur when two or more keys are held down simultaneously. A programmable activation delay insures that key rollover does not accidentally activate these functions. In contrast, synchronous or qualified chording requires that a particular key (for example, the select key) be pressed first and then held while a second key is entered. As implemented in this system, synchronous chording can be enabled for selected key combinations. A programmable activation delay is also used in this context, which can be made much shorter than for asynchronous chording.

Figure 7A:
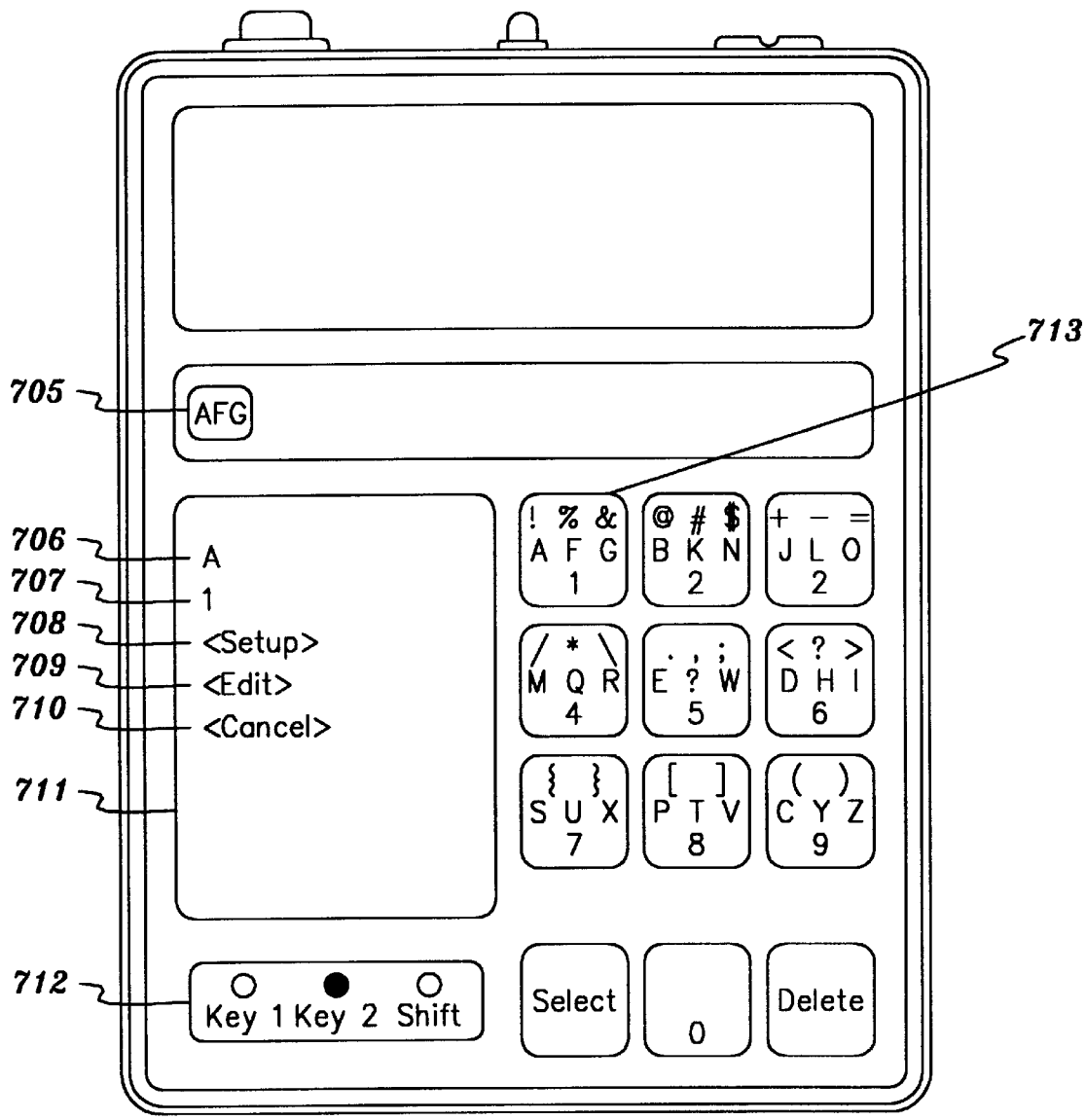
Figure 7B:
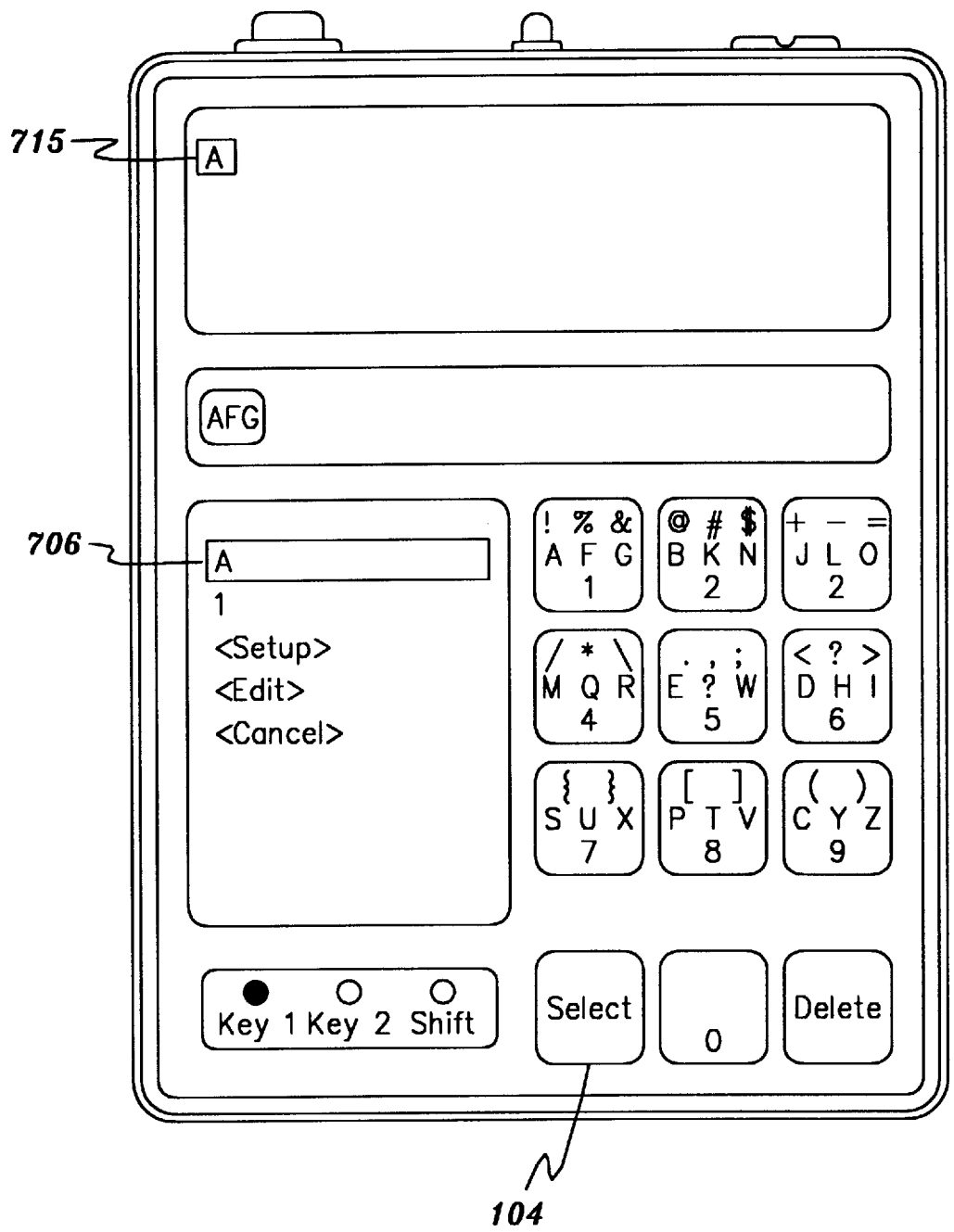
Figure 7C:
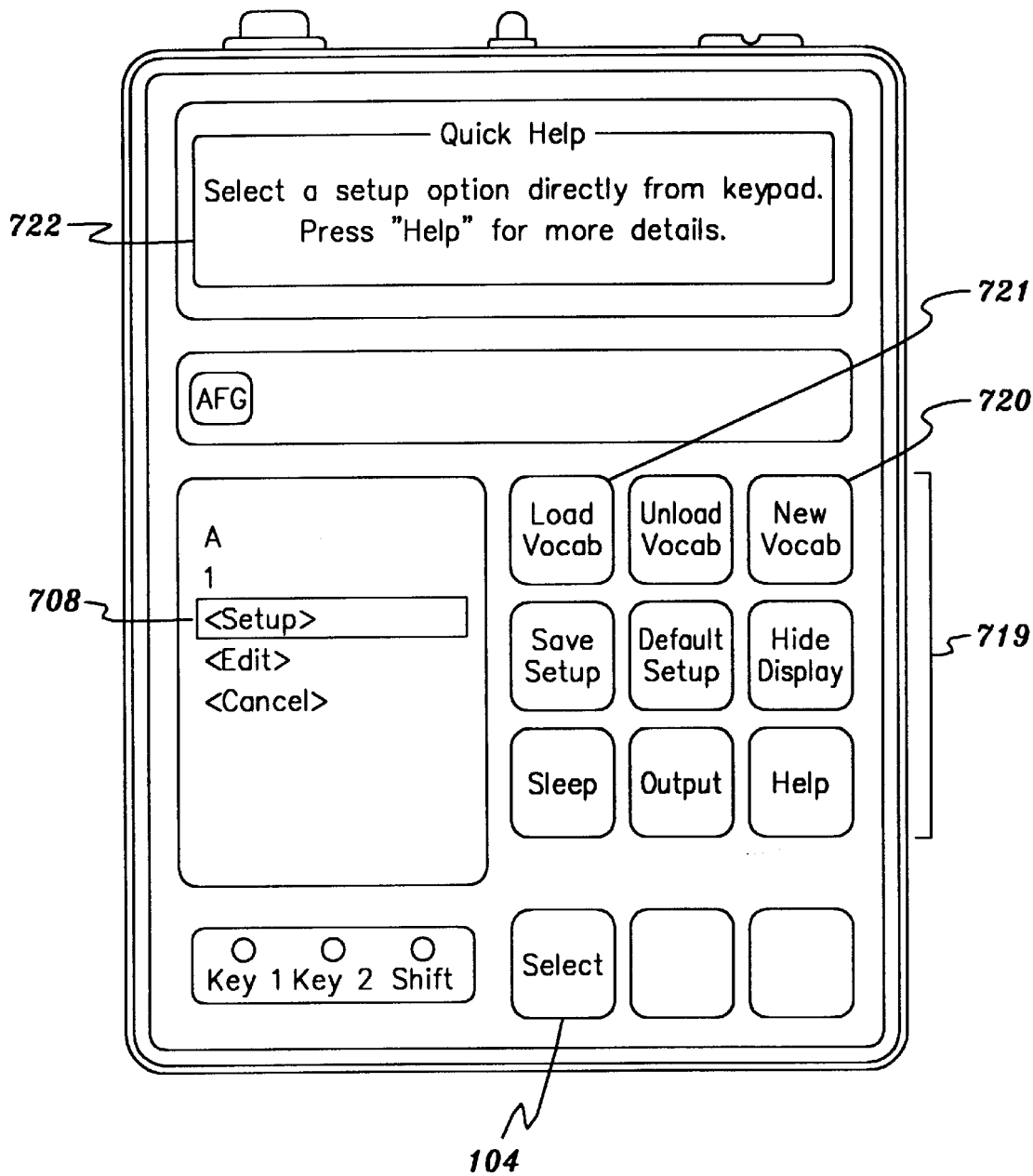
Figure 7D:
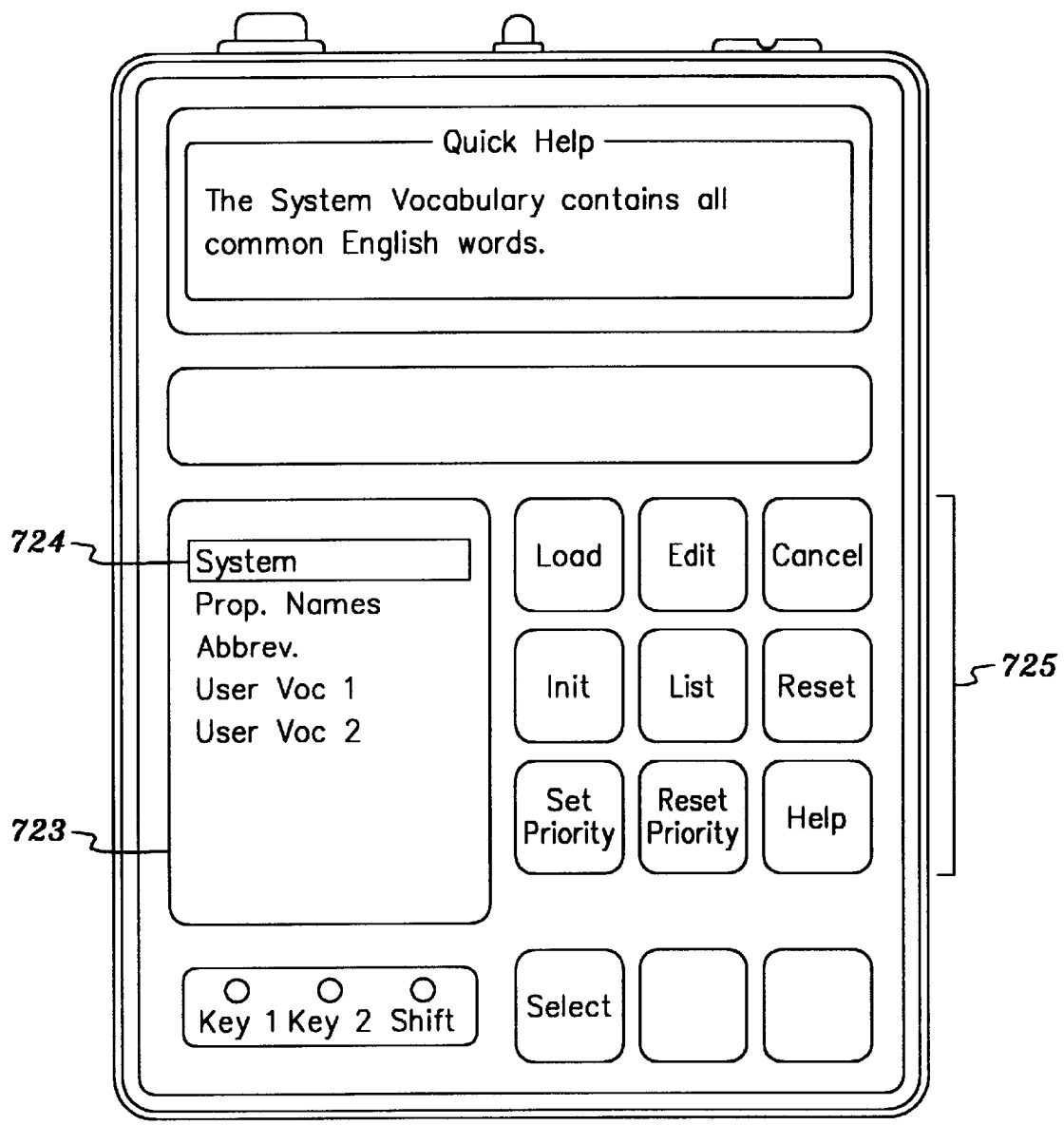
Figure 7E:
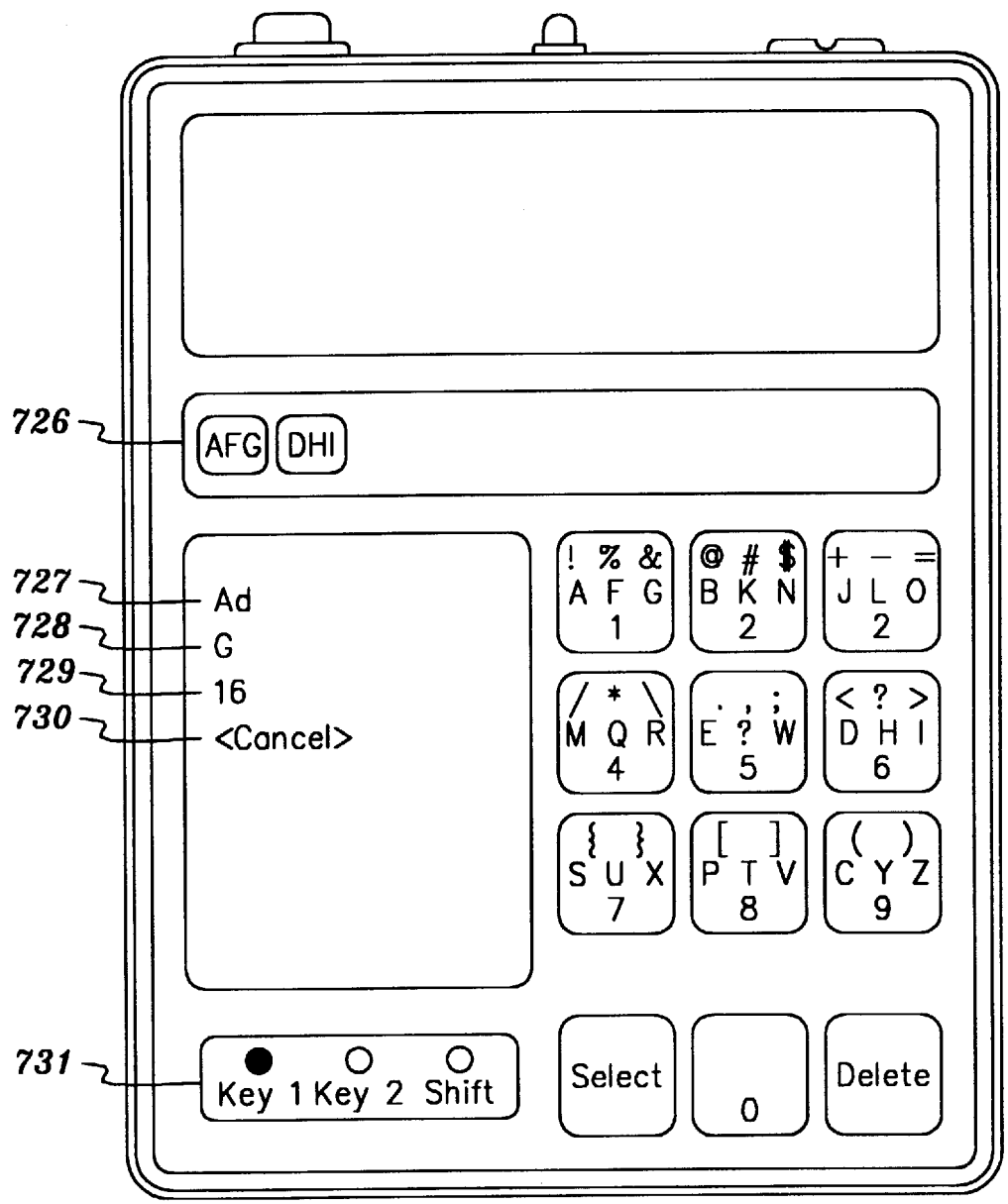
Figure 7F:
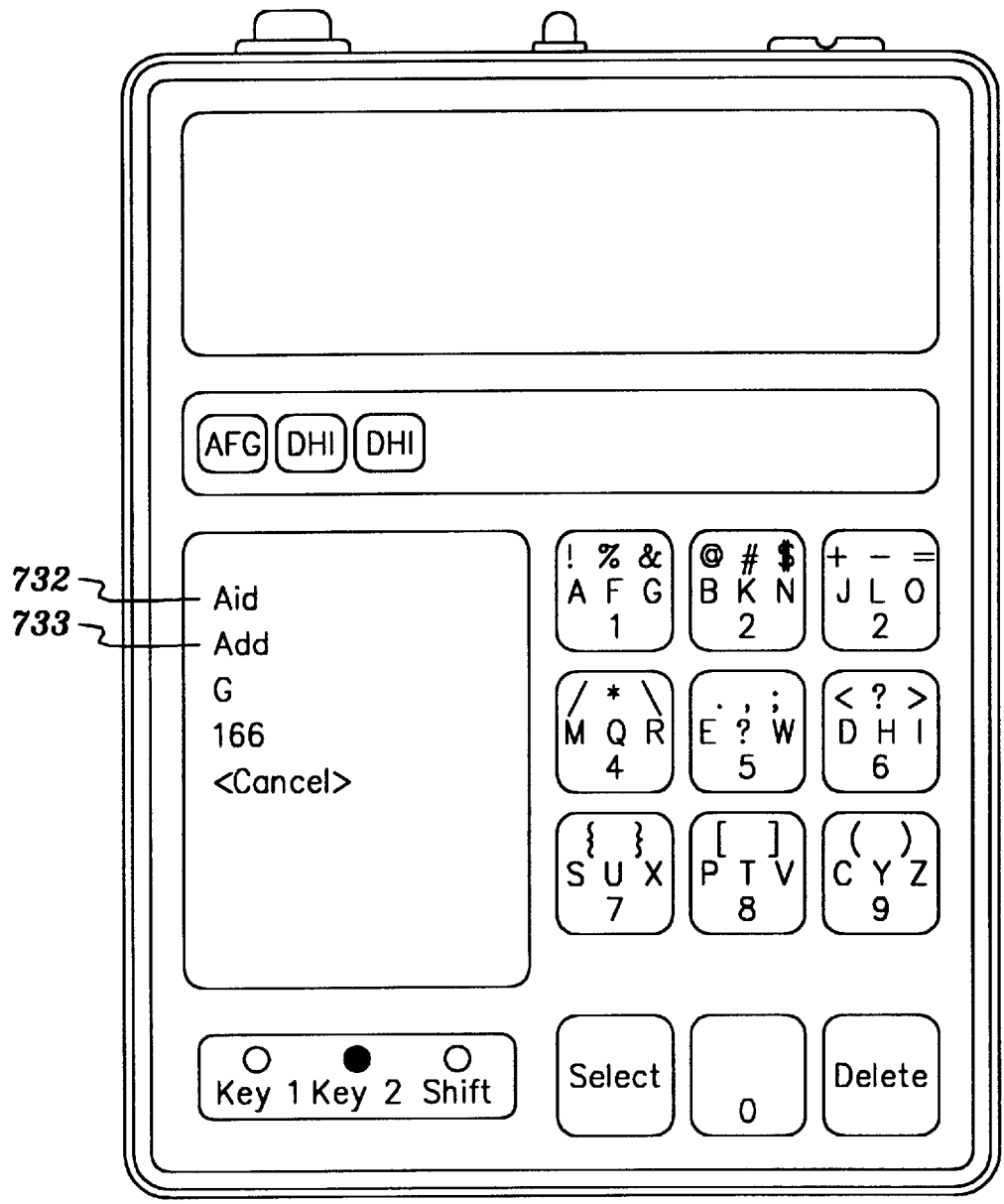
Figure 7G:
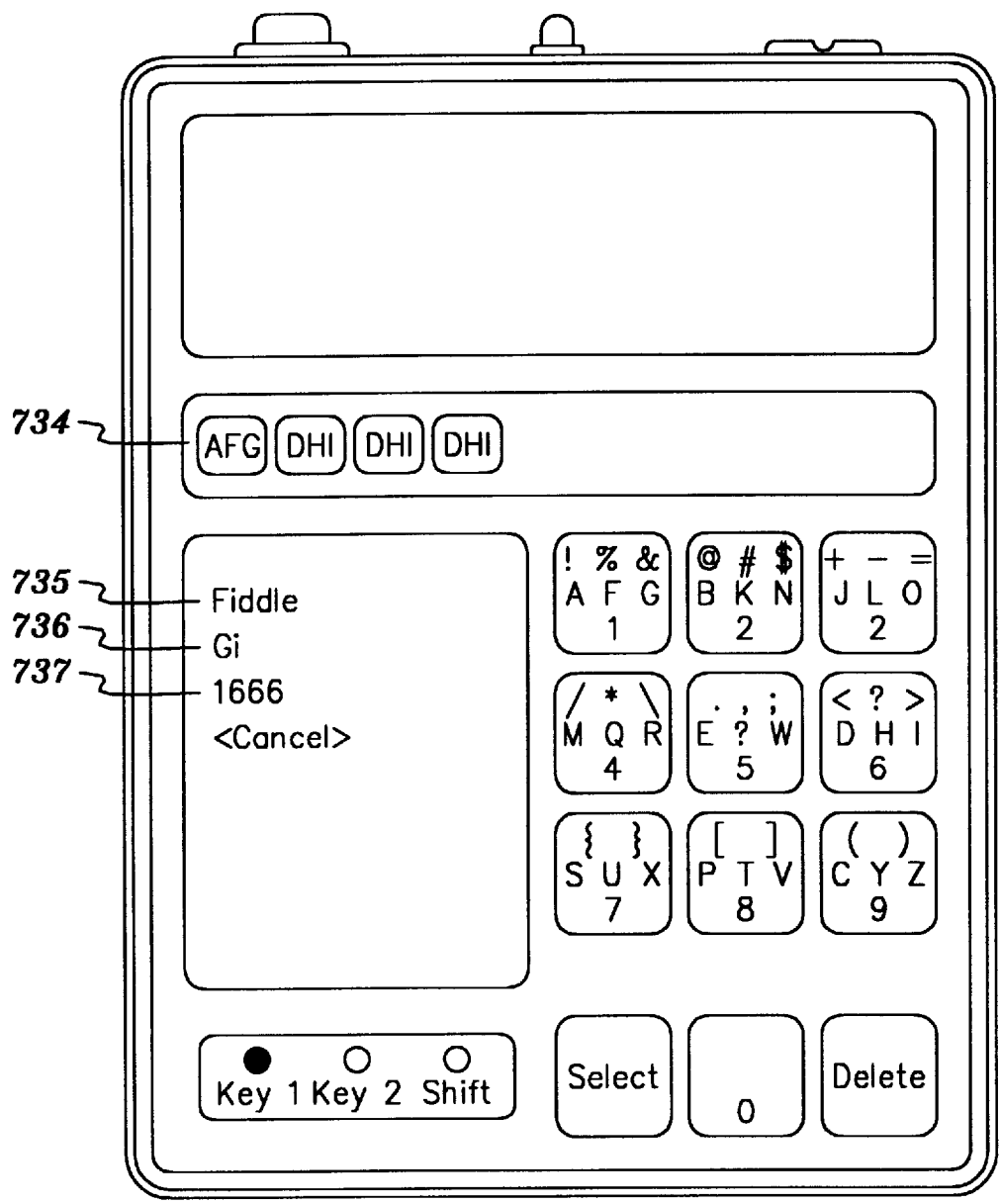

Synchronous chording is supported by the Vocabulary Manager (discussed below) which polls vocabularies on both key-down and key-up events. This system implements synchronous chording for the select key, followed by any other key. As shown in FIG. 7j, one of the system vocabularies responds to the select-key-down message by redrawing all key faces to indicate their chorded functions. A short (programmable) delay precedes this redraw to allow for select key presses which are not part of a synchronous key-pair.

While this discussion refers to keys and keystrokes on a touch-sensitive liquid crystal display, these disambiguation techniques can be used with other input and display devices. For example, any pointing device such as a mouse or a light pen can be used to make selections, or selections can be entered with standard mechanical keys. Moreover, any standard display device can be used for display output.

Editing and output

Figure 9:
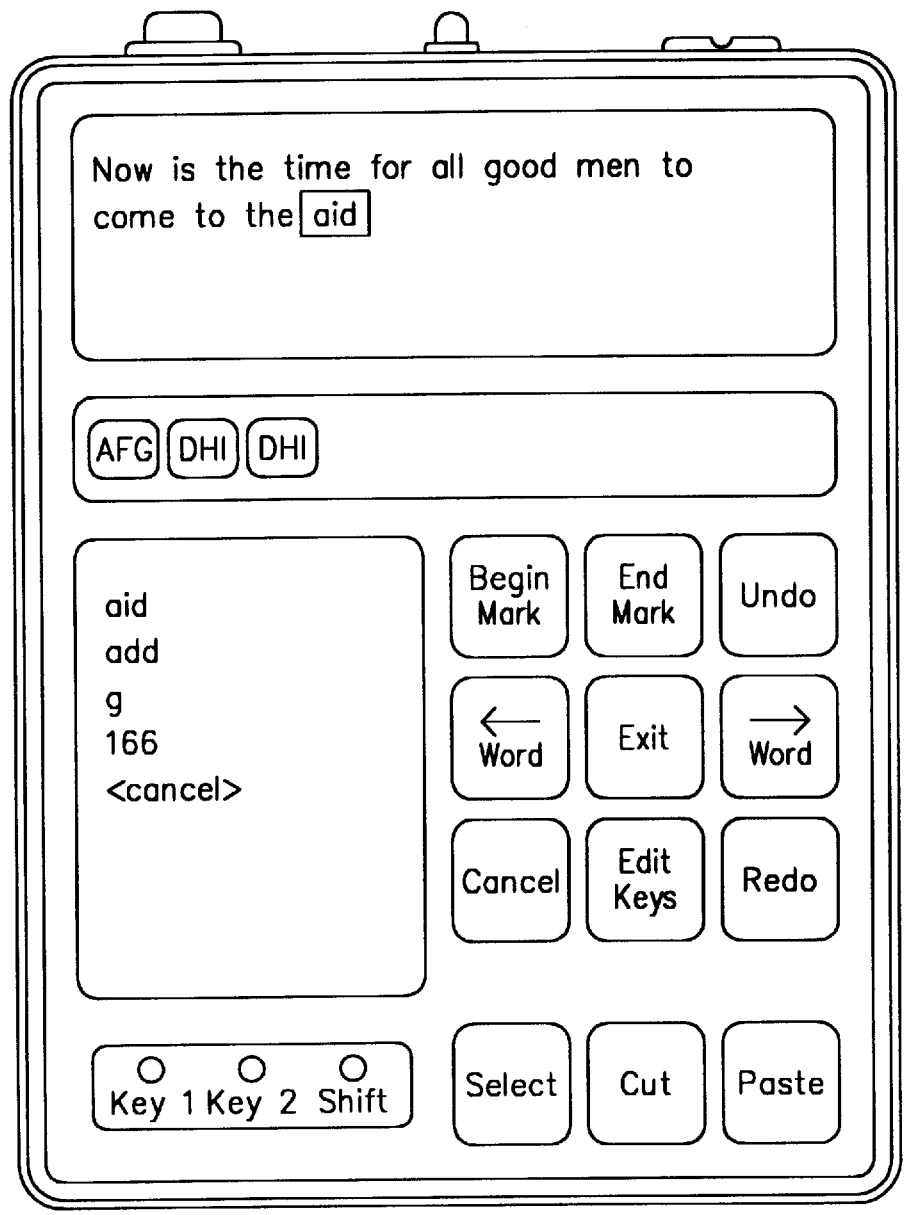
FIG. 9 shows the keys re-labeled for editing.

With the keys relabeled by the system as shown in FIG. 9, objects and words in the output buffer 101 may be edited. The Edit menu is accessed via synchronous chording. As described above, each key sequence can be interpreted in several ways. Maintaining information about the keys used to generate a particular object or word allows the user to return at a later time and choose alternative interpretations. FIG. 11 shows the temporary data structure associated with each object or word in the buffer. Data fields include the key sequence 1101 which was used to locate/address the item, and, for items which were selected from the selection list menu, a tag or handle 1102 which uniquely distinguishes the item from other items in the list. The editor system uses this information to reconstruct the environment (e.g., contents of the selection list menu) in which the object was created and selected.

The editor has three modes: objects in the output buffer may be edited as words, as letter-pairs, or as a sequence of keystrokes.

In this touch-sensitive implementation the user can select a word or object for editing by touching just below the object in the output buffer display 101. Touching an object in this way automatically highlights the object and places the system in edit mode, shown in FIG. 9, where standard editing functions are directly available via the keypad.

One useful editing feature is the re-spell mode. Sometimes the user enters the key sequence for a word which is not present in the vocabularies. Rather than re-enter the entire word as key-pairs, the user selects re-spell from a system menu. Since the first key of each key-pair is already known to the system and displayed in the keystroke window 102, the user only needs to step through each position in the keystroke window by entering single keys to disambiguate each of the displayed keys. The system helps in this process by highlighting each keystroke image in turn, automatically advancing the highlight as each character position is disambiguated. Characters are posted to a string in the selection list menu as they are resolved.

Output

Generally, disambiguated output from this system is passed to another application 609, 610 running on, and sharing the resources of, this same machine. In other instances the target for output is an application running on a separate platform; output from the disambiguation system is transferred via the serial communications ports 109, 110, 611.

When desired, the output buffer may be bypassed via an option in one of the system menus. If the output target supports text editing, keystrokes representing application-specific editing commands can also be output, so that editing which would have occurred in the output buffer 101 occurs instead in the target application.

When running with other applications, the disambiguating system must often yield the display so that another application can be viewed. Before yielding, the disambiguation system creates a moveable transparent touch-sensitive region by which the disambiguation system may be recalled by the user. A direct touch on this region recalls the disambiguation system after a short delay. Touching this region with a sliding motion, however, moves it to another position on the display without disturbing the running application.

Automatic storage, shortcuts and relocation

Figure 7H:
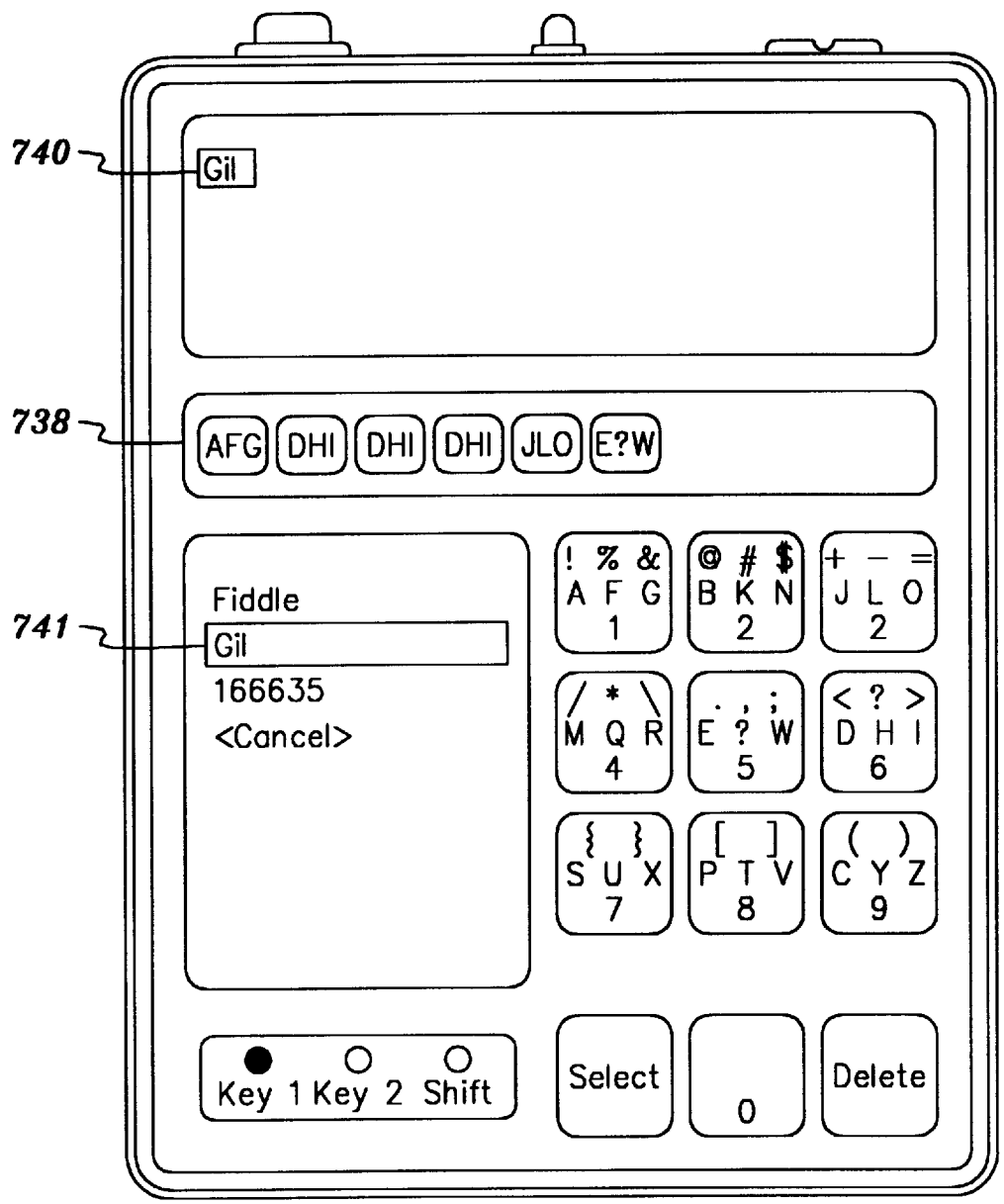

Data items entered as pairs of keys as shown in FIG. 7h are automatically stored by the system in a vocabulary so that they are thereafter available via the shorter sequence of single (ambiguous) keys. The system retrieves these items when the user enters the key sequence comprised of the first key of each original key pair.

This system also allows selection list menu items and key items to be moved or copied so that they appear when a different sequence of keys is entered. For example, to create a shortcut to an item in the selection list menu, the user selects "Create Shortcut" from a system menu. Two key sequences are then entered, one to locate the target item, and a second shortcut sequence indicating a new location for the item.

Color associations

The association between symbol position on the face of each key and key position in the 3-by-3 array of keys is aided by the use of color. The top row of keys is red and the top row of symbols on each key is also red. The middle row of keys is blue, and the middle row of symbols on each key is also blue. The bottom row of keys is green, and the bottom row of symbols on each key is green.

System Architecture

Figure 12:
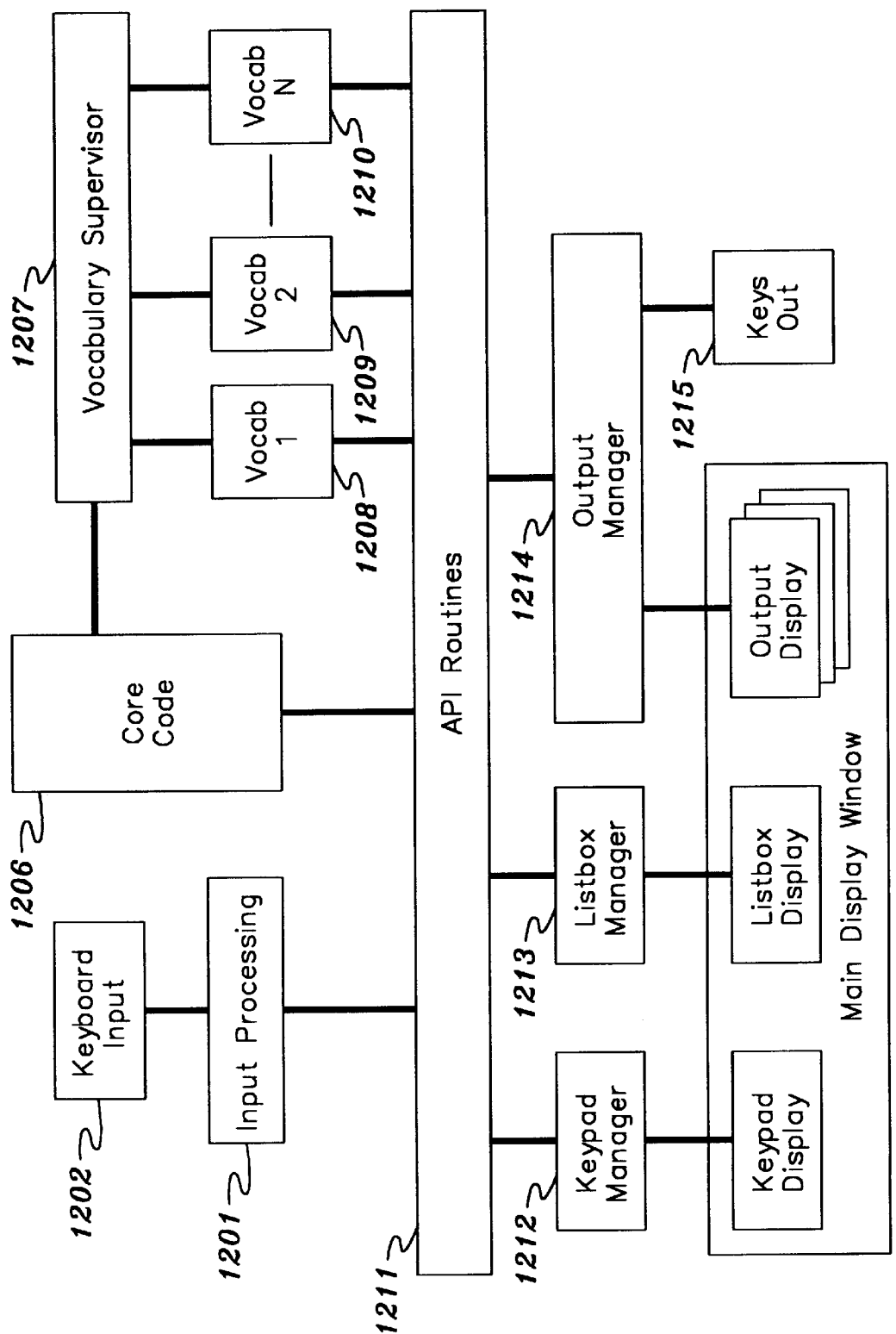
FIG. 12 shows the architecture of the disambiguating software.

FIG. 12 shows the architecture of the disambiguating software. An input processing module 1201 accepts input from a touch-sensitive LCD. Key data is passed to the core module 1206, which keeps a record of the current key sequence. As each key is received, the core module communicates the current key sequence to a Vocabulary Supervisor 1207, which broadcasts the sequence to the multiple vocabulary modules 1208 1209 1210.

The vocabulary modules 1208 1209 1210 respond individually if they are responsible for any data or action associated with the current key sequence. Vocabularies might contain English words, blocks of text, code for executing various system and user-defined functions, commonly misspelled words and their correct spelling, etc. Vocabulary modules are also responsible for implementing the numeric and key-pair interpretations of the input key sequence. In some instances vocabularies make direct calls into the application programming interface (API) 1211 to effect system functions.

Vocabularies often supply an object or list of objects for inclusion in the selection list menu. The Vocabulary Supervisor 1207 accumulates a complete list of objects for the selection list menu from all vocabularies. When vocabulary processing is finished, the Core module 1206 calls through the API 1211 to the Listbox manager 1213. The Listbox manager 1213 orders the selection list menu items according to their individual priorities and displays them in the selection box with appropriate attributes.

If the meaning of individual keys changes, the Keypad manager 1212 is called to redraw keys. If a key sequence has resulted in output information (e.g., text), the Output manager 1214 is called to update the current output display.

In many cases, the disambiguation system will be used to directly pass data (e.g., text) to another application program 609, 610 running on the same computer. This can be done by calling the Keys Out module 1215 to simulate keystrokes to the operating system 606.

Disambiguation Method

FIGS. 7*a* through 7*l* show the appearance of the system in actual use. Upon initialization, the text window 101, keystroke window 102, and selection list menu 107 are all empty. The status window 108 indicates that the next key press will be interpreted as key 1 of a pair 214, and that the next letter received will be capitalized 216.

In FIG. 7*a* the user has pressed the A-F-G key. This key press is displayed graphically in the keystroke window 705. The standard English vocabulary has interpreted this single key sequence as the word "A" and placed this word 706, capitalized, in the selection list menu 711. The digits vocabulary has interpreted the keystroke as the digit "1" 707. The system command vocabulary has responded to this key sequence by adding three system commands 708 709 710 to the menu. The status window 712 is indicating that the next key received will be interpreted as key 2 of a pair.

In FIG. 7*b* the user has pressed the select key 104, selecting and highlighting the first object in the selection list menu, the word "A" 706. A highlighted copy of this word 715 has also been placed provisionally in the text output window.

In FIG. 7*c* the user has pressed the select key 104 two additional times, selecting and highlighting the system command "<Setup>" 708. Code associated with this command has redrawn the keypad 719 to display various menu options 720, 721 directly on the key faces. Help information 722 has automatically been displayed in the text output window.

In FIG. 7*d* the user has selected the "Load Vocab" menu item 721 of FIG. 7*c*. The selection list menu 723 is displaying a list of vocabularies which can be loaded. The first of these, the standard system vocabulary 724, has been highlighted and selected by default. The keypad 725 has been redrawn to reflect the new set of options associated with the various keys.

FIG. 7*e* results if the user presses the D-H-I key after FIG. 7*a*. The two key presses are displayed graphically in the keystroke window 726. The standard English vocabulary has interpreted these two keys as the word "Ad" and placed this word 727 in the selection list menu. The vocabulary responsible for key-pair translations has interpreted this pair of keys as the letter "G" 728. The digits vocabulary has interpreted these two keys as the digit string "16" 729. The system command vocabulary has responded to this two-key sequence by adding the system command "<cancel>" 730 to the list. The status window 731 is indicating that the next key received will be interpreted as key 1 of the next pair.

In FIG. 7*f*, the user has again pressed the D-H-I key. The standard English vocabulary has matched these keys to two words, "Aid" 732, and "Add" 733. By default, multiple words are ordered in the selection list menu so that the most frequently occurring words appear first.

In FIG. 7*g*, the user has pressed the D-H-I key a third time. The four accumulated keystrokes appear in the keystroke window 734. The standard English vocabulary has found no words which exactly match these four keys. However, by "looking ahead" it has located a longer word, "fiddle" 735, and presented this to the user as an option. The pair-wise interpretation of these four keys results in the string "Gi" 736, and the digit interpretation, "1666" 737, is also presented.

In FIG. 7*h*, the user has pressed two additional keys J-L-O and E-?-W, shown in the keystroke window 738. The standard English vocabulary still produces a match for "Fiddle". The vocabulary which performs key-pair interpretation has placed the string "Gil" in the selection list. The user has also selected the key-pair string "Gil" 741, causing a copy to be placed provisionally in the output window 740. When the user presses a letter for the following word, finalizing the selection of the word "Gil", the system automatically adds the new word "Gil" to the user's private vocabulary; in subsequent usage the user can spell "Gil" with the single keystrokes A-F-G, D-H-I, J-L-0.

Figure 7I:
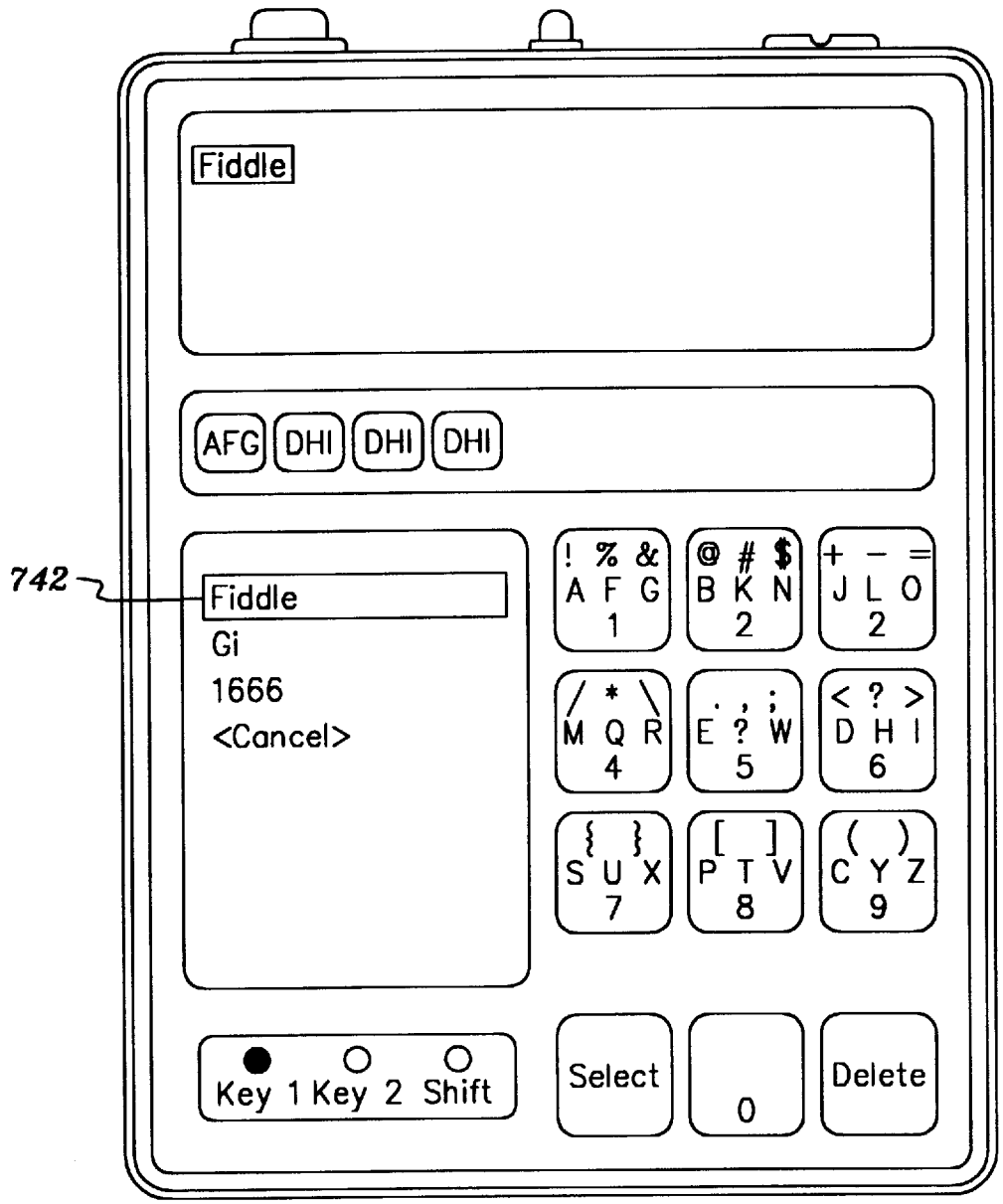
Figure 7J:
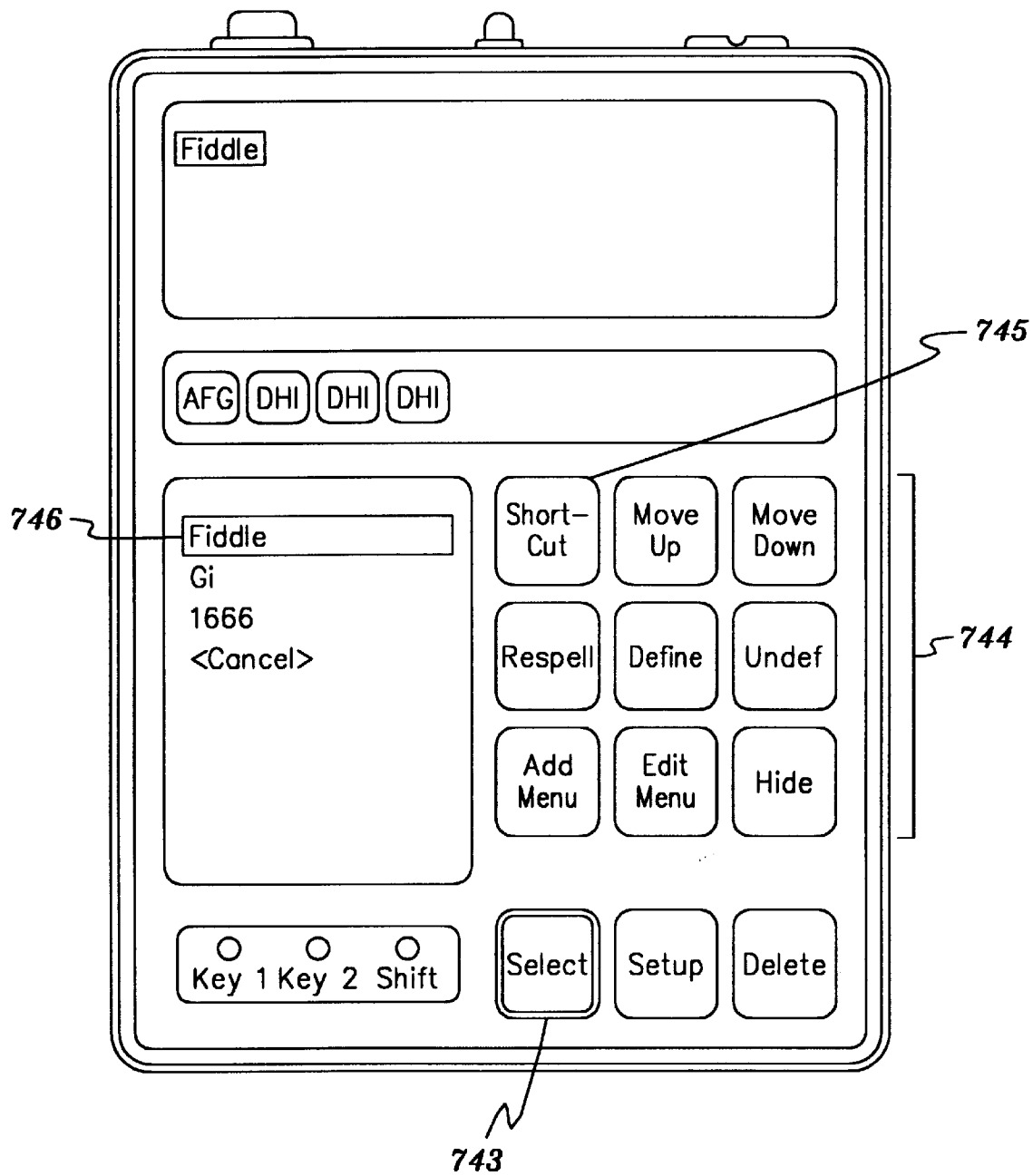

FIG. 7*i* results if the user presses and releases the select key after FIG. 7*g*, selecting the word "fiddle" 742.

Instead of pressing and releasing the select key, in FIG. 7*j*, the user is pressing and holding the select key 743. After a short delay, the display has been redrawn to show the synchronous chording key meanings; these labels 744 indicate how each key will be interpreted if pressed while the select key is being held down. Chorded key combinations are accessible at any time and can be entered without disturbing other input processes.

Figure 7K:
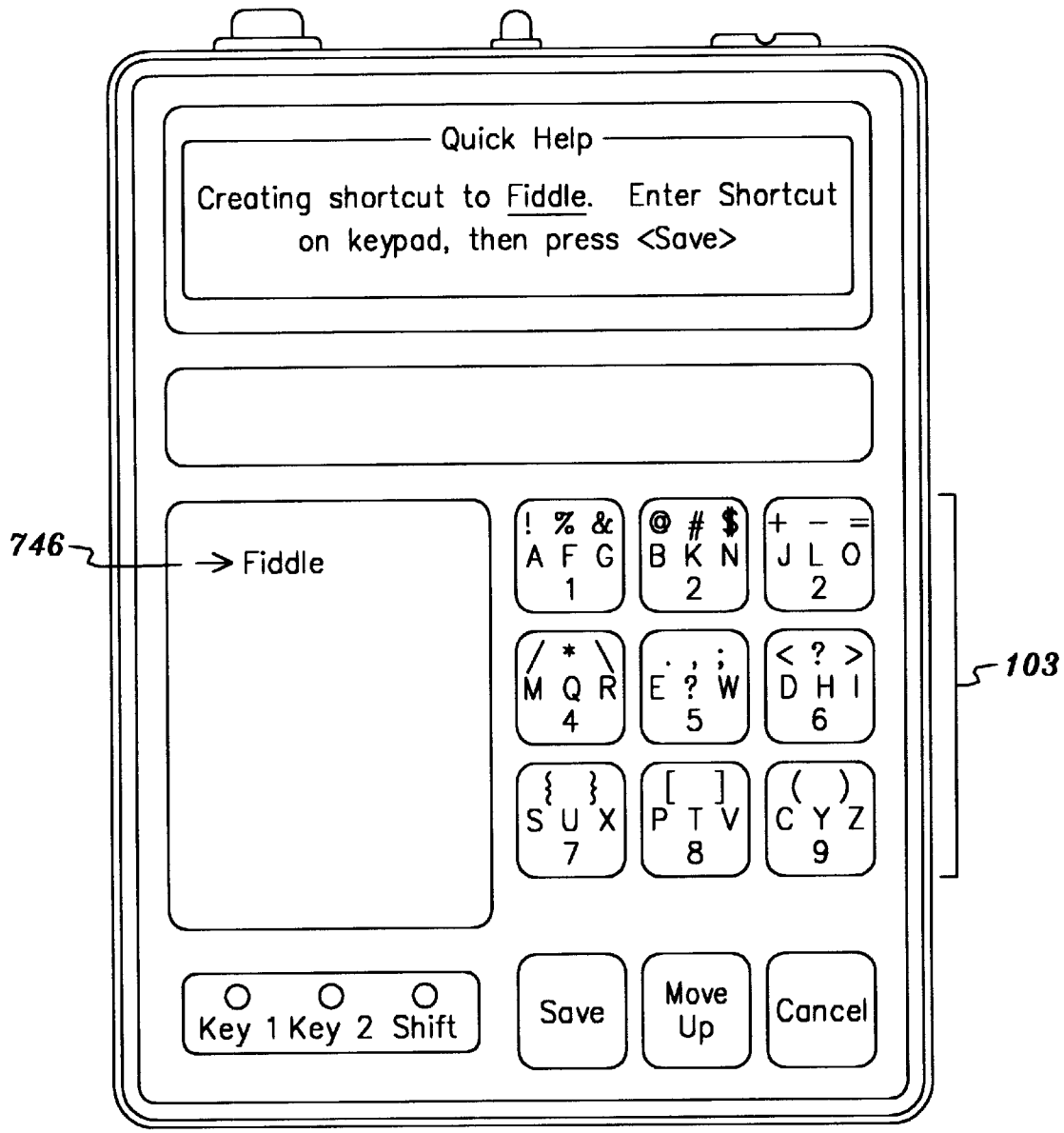
Figure 71:
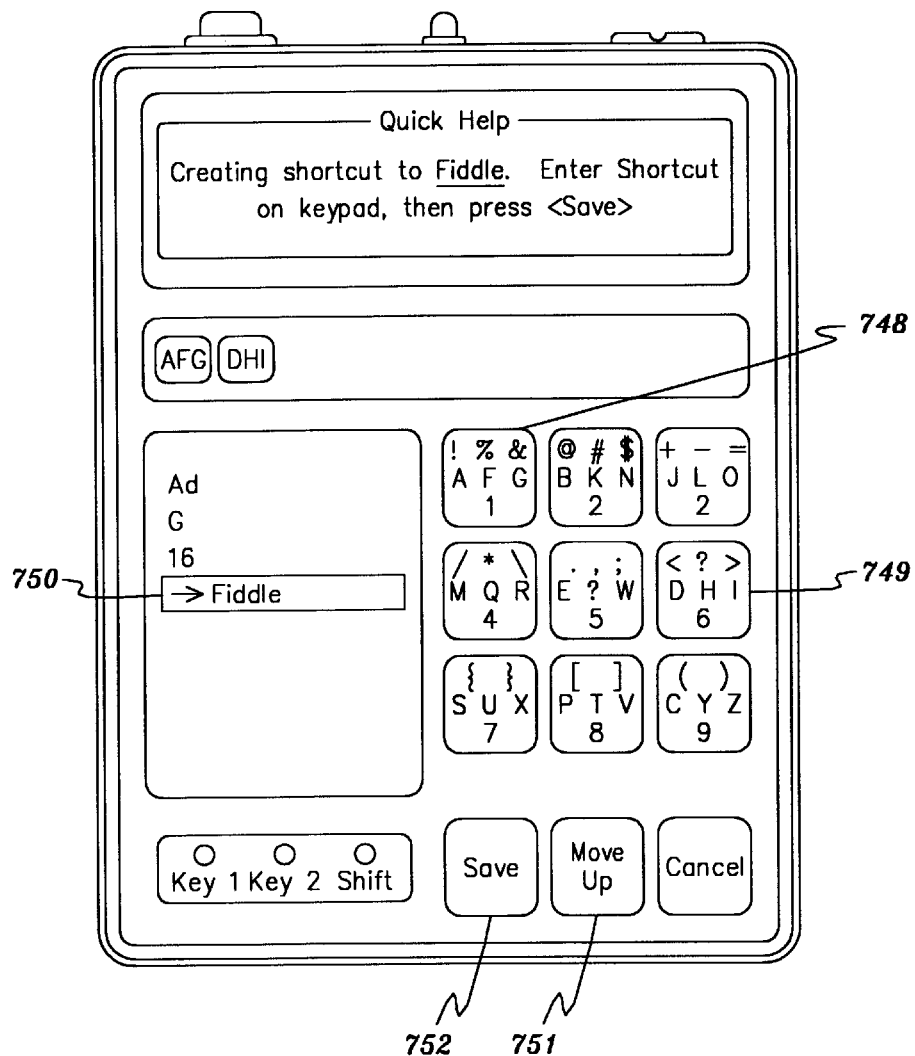

FIG. 7*k* results from FIG. 7*j* after the user enters the chorded combination Select 743 plus Shortcut 745. This is telling the system to define a new sequence of keys which will lead to the word "fiddle" 746. The keypad 103 is now used to enter the new key sequence for fiddle.

In FIG. 7*l*, the user has entered the two keys A-F-G 748, D-H-I 749. At each keystroke the shortcut-to-fiddle symbol 750 appears highlighted in the selection list menu. The Move Up key 751 is used to adjust the location of the shortcut within a particular menu.

Vocabulary look-up processing

Vocabulary look-up processing may be handled by a simple binary search. A key field may be generated from text by converting each letter of the text to a number representing the key on which the letter appears. Text records are then stored in memory in sorted order based on this key field. To locate the text associated with a key sequence entered on the keypad requires only that the key numbers of the sequence be used to generate a key field, which can then be used for search comparisons.

Processing is simplified by noting that the system may group all vocabulary elements according to key sequence length. Then, for example, when the user enters the fifth key of a sequence, the system only needs to check elements of length 5. Note that the key field need not directly correspond to letters in the stored item. In general, a vocabulary object or element may be stored at an arbitrary location, i.e., under an arbitrary key sequence. This freedom is used to advantage when the system stores abbreviations and contractions; these are typically stored at the location which corresponds to their pure alphabetic content, ignoring punctuation. The result is that contractions and abbreviations are easily accessed by the user without entering punctuation, resulting in a significant savings in keystrokes. Similarly, words which should always be used in all capital letters, with an initial capital letter, or with a capital letter in the middle are stored and presented in this form, eliminating the need for the user to enter such capitalization.

Figure 10:
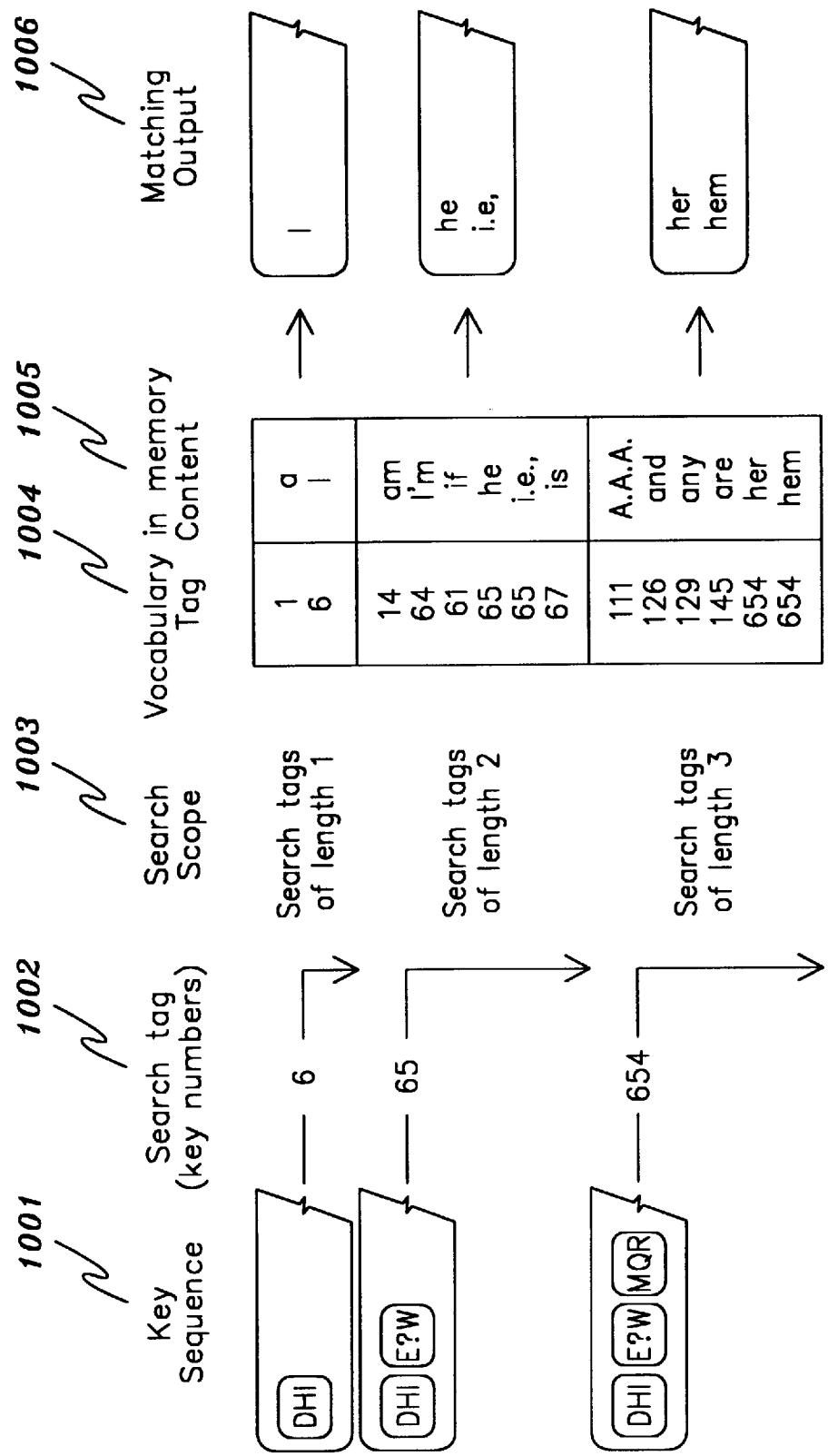
FIG. 10 represents schematically the vocabulary storage and lookup method.

FIG. 10 represents vocabulary storage and look-up schematically. The key sequence entered 1001 is converted to a search tag 1002. The length of this tag determines the search scope 1003, and is compared against tags stored in memory 1004. When a match is found, the associated content 1005 is copied to the output or display 1006.

Preferably, to save memory, the tag stored in memory 1004 is omitted. Instead, the tag is generated from the content field 1005 whenever the tag is needed for comparison during the search process. For each search, the system counts the number of letters in the keystroke string, finds the list of words which have that number of letters, calculates the tag for each word, compares the calculated tag to the keystroke string, and sends the word to the display if there is a match. Within the memory, the words are stored in order of decreasing frequency of use so that the proper order is automatically presented.

Eight-Key Version for Individuals with Disabilities

Having eight keys or cells means that any cell can be represented numerically by three bits. For individuals with disabilities who work best with a Morse-like code, each ambiguous keystroke can be encoded as Morse-like sequences with an average code length of two. For individuals with disabilities who work best with scanning, the eight-key system requires scanning across only eight keys rather than 26 or more. With eight keys, more than 97% of all words require no additional keystrokes.

Figure 13:
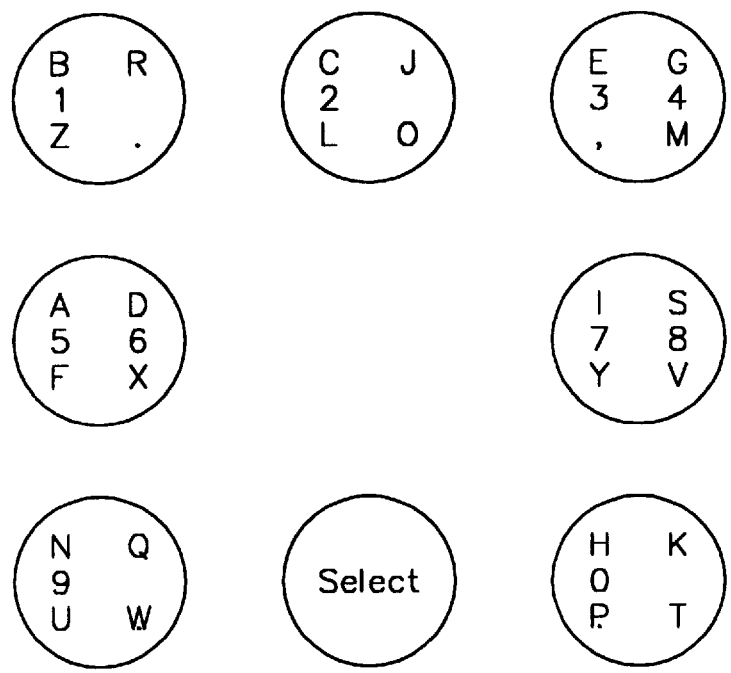
FIG. 13 shows an eight-key version for individuals with disabilities.

A suitable eight-key layout is shown in FIG. 13. Because there are not enough keys to assign one digit to each key, three of the keys each contain two digits. When entering numbers, two alternative intended digits must be considered for each position in the number that contains one of the digits 3–8.

We claim:

1. A word disambiguating computer, comprising:
   (a) a microprocessor,
   (b) a display,
   (c) a keyboard with two or more letters associated with each of a plurality of keys such that a stroke of one of said keys is ambiguous as to which letter associated with the key is intended, a key identifier sequence being generated each time a key is selected,
   (d) a first memory containing a plurality of key identifier sequences and, associated with each key identifier sequence, a set of words whose spellings correspond to the key identifier sequence,
   (e) a second memory containing a set of microprocessor instructions which causes said microprocessor to receive each key identifier sequence from said keyboard and present on said display at least one of the words from the set of words whose spelling corresponds to the key identifier sequence, and
   (f) a user input circuit which receives from a user a selection of the words from the set of words whose spelling corresponds to the key identifier sequence.

2. The computer of claim 1 further comprising a third memory containing letters and, associated with each letter, a corresponding ordered pair of keystrokes, wherein:
   (a) said microprocessor instructions also cause said microprocessor to break the sequence of keystrokes into ordered pairs of keystrokes, retrieve from said third memory the letter corresponding to each ordered pair thereby creating a sequence of letters, and present to a user the sequence of letters; and
   (b) said user input circuit also allows a user to alternatively select the presented sequence of letters.

3. The computer of claim 2 further comprising an indicator which indicates whether the next keystroke will be interpreted as a first stroke of an ordered pair of keystrokes or a second stroke of an ordered pair of keystrokes.

4. The computer of claim 1, wherein:
   (a) said first memory also contains, associated with each set of words whose spellings correspond to the sequence, an indication of which word of the set of words is most frequently used, and
   (b) said microprocessor instructions also cause said microprocessor to display first the word of the set of words which is most frequently used.

5. The computer of claim 1 wherein:
   (a) a numeral is also associated with each of said plurality of keys such that a stroke of one of the keys is ambiguous as to which of the two or more letters or the numeral associated with the key is intended,
   (b) said microprocessor instructions also cause said microprocessor to present on said display with the set of words whose spellings correspond to the sequence, a sequence of numerals corresponding to the sequence of keystrokes, and
   (c) said user input circuit may alternatively receive from a user a selection of the sequence of numerals.

6. The computer of claim 1 wherein the words of the set of words are presented on said display simultaneously.

7. The computer of claim 1, wherein the two or more letters associated with each of a plurality of keys are in a substantially non-alphabetic sequence.

8. An electronic disambiguating word input device, comprising:
   (a) a display,
   (b) a keyboard with two or more letters associated with each of a plurality of keys such that a stroke of one of said keys is ambiguous as to which letter associated with the key is intended, a key identifier sequence being generated each time a key is selected,
   (c) a memory containing a plurality of key identifier sequences and, associated with each key identifier sequence, a set of words whose spellings correspond to the key identifier sequence,
   (d) a logic circuit which receives each key identifier sequence from said keyboard and presents on said display at least one of the words from the set of words whose spelling corresponds to the key identifier sequence, and
   (e) a user input circuit which receives from a user a selection of one of the words from the set of words whose spelling corresponds to the key identifier sequence.

9. The device of claim 8 wherein said keyboard also includes a key without letters, a first stroke of which delimits a preceding sequence of key identifiers.

10. The device of claim 9, wherein the first stroke of said key without letters also selects the first presented word from said set of words and a second stroke of said key without letters, with no intervening keystroke between said first and second strokes, selects the second presented word of said set of words.

11. The device of claim 8, wherein:
   (a) said memory also contains, associated with each set of words whose spellings correspond to the sequence, an indication of which of the words is most frequently used, and (b) said logic circuit which receives a sequence of key identifiers from said keyboard presents first the one of the words which is most frequently used.

12. The input device of claim 8, further comprising a second memory containing letters and, associated with each letter, a corresponding ordered pair of keystrokes, wherein
   (a) said logic circuit breaks the sequence of keystrokes into ordered pair of keystrokes, retrieves from said second memory the letter corresponding to each ordered pair thereby creating a sequence of letters, and presents to a user the sequence of letters, and
   (b) said user input circuit also allows a user to alternatively select the presented sequence of letters.

13. An electronic disambiguating word and numbers input device, comprising:
   (a) a keyboard with two or more letters associated with each of a plurality of keys and a numeral associated with each of said plurality of keys such that a stroke of one of said keys is ambiguous as to which of the two or more letters or the numeral associated with the key is intended, a key identifier sequence being generated each time a key is selected,
   (b) a first memory containing a plurality of key identifier sequences and, associated with each key identifier sequence, a set of words whose spellings correspond to the key identifier sequence,
   (c) a first logic circuit which receives each key identifier sequence from said keyboard, presents to a user at least one of the words from the set of words whose spellings correspond to the key identifier sequence, and presents to a user a sequence of numerals corresponding to the key identifier sequence, and
   (d) a user input circuit which receives from a user a selection of one of the words from the set of words whose spelling corresponds to the key identifier sequence or the sequence of numerals.

14. The device of claim 13 wherein the words of the set of words and the sequence of numerals are presented simultaneously.

15. The device of claim 13, wherein:
   (a) said first memory also contains, associated with a set of words whose spellings correspond to the sequence, an indication of which of the words is most frequently used, and
   (b) said first logic circuit, when outputting the set of words, outputs first the one of the words which is most frequently used.

16. The device of claim 13 wherein said keyboard also includes a key without letters or numerals, a first stroke of which delimits a preceding sequence of key identifiers.

17. The device of claim 16 wherein the first stroke of said key without letters or numerals also selects the first presented word of said set of words and a second stroke of said key without letters or numerals, without an intervening keystroke between said first and said second strokes, selects the second presented word of said set of words.

18. The device of claim 8 wherein the letters associated with each of said plurality of keys are ordered in a substantially non-alphabetic sequence.

19. The device of claim 8 wherein the presented words and the presented sequence of letters are presented simultaneously.

20. The input device of claim 12 further comprising an indicator which indicates whether the next key will be interpreted as a first stroke of an ordered pair of keystrokes or a second stroke of an ordered pair of keystrokes.

21. A data storage medium containing a logic program which program causes a logic processor to:
   (a) receive a sequence of key identifiers from a keyboard with two or more letters associated with each of a plurality of keys such that a stroke of one of the keys is ambiguous as to which letter associated with the key is intended, a key identifier sequence being generated each time a key is selected,
   (b) compare the received sequence of key identifiers to sequences of key identifiers in a first memory containing a plurality of sequences of key identifiers and, associated with each sequence of key identifiers, a set of words whose spellings correspond to the sequence,
   (c) display to a user at least one of the words from the set of words whose spellings correspond to each sequence, of key identifiers, and
   (d) receive from a user a selection of a word from the set of words.

22. The storage medium of claim 21, wherein the program also causes the logic processor to:
   (a) display first among the set of words displayed the word among the set of words which is most frequently used according to indication stored in the first memory.

23. The storage medium of claim 21 wherein the program also causes the logic processor to:
   (a) receive from the keyboard a delimiting keystroke identifier which is not associated with a letter, which identifier delimits a previously received sequence of key identifiers.

24. The storage medium of claim 23 wherein the program also causes the logic processor to:
   (a) respond to the receipt of a first said delimiting keystroke identifier by selecting the first presented word of said set of words, and
   (b) respond to the receipt of a second said delimiting keystroke identifier without having received an intervening keystroke identifier between the receipt of the first and the second keystroke identifiers by selecting the second presented word of said set of words.

25. The data storage medium of claim 21, further comprising a second memory containing letters and, associated with each letter, a corresponding ordered pair of keystrokes, wherein
   said logic program also causes said logic processor to break the sequence of keystrokes into ordered pair of keystrokes, retrieve from said second memory the letter corresponding to each ordered pair thereby creating a sequence of letters, present to a user the sequence of letters, and allow a user to alternatively select the presented sequence of letters.

26. A data storage medium containing a logic program which program causes a logic processor to:
   (a) receive a sequence of key identifiers from a keyboard with two or more letters associated with each of a plurality of keys and a numeral associated with each of the plurality of keys such that a stroke of one of the keys is ambiguous as to which of the two or more letters or the numeral associated with the key is intended, a key identifier sequence being generated each time a key is selected,
   (b) compare the received sequence of key identifiers to sequences of key identifiers in a first memory containing a plurality of sequences of key identifiers and, associated with each sequence of key identifiers, a set of words whose spellings correspond to the sequence and a numeral which corresponds to the sequence, (c) display to a user at least one of the words from the set of words in the memory whose spelling corresponds to each sequence and a numeral which corresponds to each sequence of key identifiers, and (d) receive from a user a selection of a word from the set of words or the sequence of numerals.

27. The storage medium of claim 26, wherein the words of the set of words and the sequence of numerals are presented simultaneously.

28. The storage medium of claim 26, wherein the program also causes the logic processor to:

(a) present first among the set of words presented the word among the set of words which is most frequently used according to an indication in the first memory.

29. The storage medium of claim 26 wherein the program also causes the logic processor to:

(a) receive from the keyboard a first delimiting keystroke identifier which is not associated with a letter, which identifier delimits a previously received sequence of key identifiers.

30. The storage medium of claim 29 wherein the program also causes the logic processor to:

(a) interpret said first receipt of said delimiting keystroke identifier as a selection of the first presented word of said set of words and interpret a second receipt of said delimiting keystroke identifier with no receipt of another keystroke identifier between said first and said second delimiting keystroke identifiers as a selection of the second presented word of said set of words.

31. The storage medium of claim 21 wherein the program also causes the logic processor to:

(a) present the presented words and the presented sequence of letters simultaneously.

32. The storage medium of claim 25 wherein the program also causes the logic processor to:

(a) indicate to a user whether the next key will be interpreted as a first stroke of an ordered pair of keystrokes or a second stroke of an ordered pair of keystrokes.

* * * * *